(12) United States Patent
Wang

(10) Patent No.: US 12,004,139 B2
(45) Date of Patent: Jun. 4, 2024

(54) METHOD AND APPARATUS FOR UPLINK IMPLEMENTATION

(71) Applicant: FG Innovation Company Limited, Tuen Mun (HK)

(72) Inventor: Hai-Han Wang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/966,140

(22) Filed: Oct. 14, 2022

(65) Prior Publication Data

US 2023/0039964 A1 Feb. 9, 2023

Related U.S. Application Data

(63) Continuation of application No. 17/091,618, filed on Nov. 6, 2020, now Pat. No. 11,540,282.

(60) Provisional application No. 62/932,881, filed on Nov. 8, 2019.

(51) Int. Cl.
*H04W 72/23* (2023.01)
*H04W 72/0446* (2023.01)
*H04W 72/0453* (2023.01)

(52) U.S. Cl.
CPC ....... *H04W 72/0453* (2013.01); *H04W 72/23* (2023.01)

(58) Field of Classification Search
None
See application file for complete search history.

(56) References Cited

U.S. PATENT DOCUMENTS

| 11,140,666 B2 * | 10/2021 | Guo | H04L 1/1819 |
| 2013/0148592 A1 * | 6/2013 | Noh | H04L 5/0053 370/329 |

(Continued)

FOREIGN PATENT DOCUMENTS

| EP | 3537810 A1 | 9/2019 |
| EP | 3739795 A1 | 11/2020 |

(Continued)

OTHER PUBLICATIONS

Non-Final Rejection dated Apr. 14, 2022 for U.S. Appl. No. 17/091,618, which is the parent application of the instant application.

(Continued)

*Primary Examiner* — Sai Aung
(74) *Attorney, Agent, or Firm* — ScienBiziP, P.C.

(57) ABSTRACT

A method performed by a user equipment (UE) for handling an uplink (UL) cancellation indication (CI) is provided. The method includes receiving a UL grant scheduling a Physical Uplink Shared Channel (PUSCH), a frequency resource for the PUSCH being allocated within an active UL Bandwidth Part (BWP) of the UE; receiving the UL CI, the UL CI indicating a UL resource in a reference UL resource, the reference UL resource being allocated within a carrier including at least the active UL BWP; and defining a starting symbol of the reference UL resource. The method further includes in a case that the UL CI is received after the UL grant, determining whether the UL resource overlaps the PUSCH, and in a case that the UL resource overlaps the PUSCH, cancelling the PUSCH.

12 Claims, 7 Drawing Sheets

(56) References Cited

U.S. PATENT DOCUMENTS

| | | | | |
|---|---|---|---|---|
| 2016/0381674 | A1* | 12/2016 | Kim | H04L 1/1819 |
| | | | | 370/329 |
| 2019/0037586 | A1* | 1/2019 | Park | H04L 5/00 |
| 2019/0327755 | A1* | 10/2019 | Xiong | H04L 5/0046 |
| 2019/0364558 | A1* | 11/2019 | Kim | H04L 5/0053 |
| 2020/0196343 | A1* | 6/2020 | Marinier | H04L 1/1896 |
| 2020/0404648 | A1* | 12/2020 | Kim | H04L 5/0044 |

FOREIGN PATENT DOCUMENTS

| | | |
|---|---|---|
| WO | 2019139446 A1 | 7/2019 |
| WO | 2019191977 A1 | 10/2019 |

OTHER PUBLICATIONS

Notice of Allowance dated Jul. 29, 2022 for U.S. Appl. No. 17/091,618, which is the parent application of the instant application.

ZTE, "On Inter-UE multiplexing between eMBB and URLLC", R1-1808212, 3GPP TSG RAN WG1 Meeting #94, Gothenburg, Sweden, Aug. 20-24, 2018, section 3.

Vivo, "Multiplexing data with different transmission durations", R1-1800205, 3GPP TSG RAN WG1 Meeting AH 1801, Vancouver, Canada, Jan. 22-26, 2018, section 3.

Fujitsu: "Discussion on UL preemption indication", 3GPP Draft; R1-1905488, 3GPP TSG RAN WG1 #96bis, Xi'an, China, Apr. 8-12, 2019(Apr. 3, 2019), section 2.2 UE processing timeline cancellation.

* cited by examiner

METHOD AND APPARATUS FOR UPLINK IMPLEMENTATION

CROSS-REFERENCE TO RELATED APPLICATION(S)

The present application is a continuation application of U.S. patent application Ser. No. 17/091,618, filed on Nov. 6, 2020, which claims the benefit of and priority to U.S. Provisional Patent Application Ser. No. 62/932,881, filed on Nov. 8, 2019, the contents of all of which are hereby incorporated herein fully by reference into the present application.

BACKGROUND

In a new radio (NR) system, multiple types of services may be supported in a cell, each with different latency and reliability requirements. When enhanced Mobile Broadband (eMBB) and Ultra-Reliable Low-Latency Communication (URLLC) services coexist in the same cell, it is possible that resources are already scheduled for transmission of eMBB traffic when URLLC traffic occurs. This scheduling issue can prioritize the eMBB traffic over the URLLC traffic, thus increasing the latency of the URLLC traffic. In this situation, to guarantee latency requirements for a URLLC service are met, resources scheduled for eMBB traffic need to be re-assigned for URLLC traffic. In Rel-15 NR, a downlink pre-emption indication (PI) was specified for this purpose. The downlink (DL) PI is transmitted to the eMBB user equipment (UE), indicating that part of the resources of the scheduled transport blocks (TB) are used for transmission of another TB for URLLC, so that the eMBB UE can avoid using the "corrupted" bits for decoding the TB.

SUMMARY

The present disclosure is related to a method for handling an uplink (UL) implementation.

According to a first aspect of the present disclosure, a method performed by a UE for handling a UL CI is provided. The method includes receiving a UL grant scheduling a Physical Uplink Shared Channel (PUSCH), a frequency resource for the PUSCH being allocated within an active UL Bandwidth Part (BWP) of a user equipment (UE); receiving the UL CI, the UE CI indicating a UL resource in a reference UL resource, the reference UL resource being allocated within a carrier including at least the active UL BWP; defining a starting symbol of the reference UL resource; and in a case that the UL CI is received after the UL grant, determining whether the UL resource overlaps the PUSCH, and in a case that the UL resource overlaps the PUSCH, cancelling the PUSCH, wherein the starting symbol is defined as a first symbol after a time duration from an end of the UL CI, and the time duration is defined based on a first time duration of minimum processing for decoding the UL grant and preparing the PUSCH and a second time duration configured by a Next-Generation Node B (gNB).

According to an implementation of the first aspect, the first time duration is determined based on a smallest subcarrier spacing (SCS) of an SCS of a downlink (DL) with which a Physical Downlink Control Channel (PDCCH) carrying the UL CI was received and a smallest SCS of configured UL BWPs of the carrier.

According to another implementation of the first aspect, the method further includes determining symbol durations of one or more symbols of the UL resource, wherein the symbol durations are based on a subcarrier spacing (SCS) of a downlink (DL) BWP in which the UL CI was received.

According to another implementation of the first aspect, the frequency resource is allocated using a physical resource block (PRB) index of the active UL BWP.

According to another implementation of the first aspect, the reference UL resource is allocated using a common resource block (CRB) index of the carrier.

According to a second aspect of the present disclosure, a non-transitory, computer-readable storage medium storing computer-executable instructions is provided. The computer-executable instructions, when executed by one or more processors of a UE, cause the UE to receive a UL grant scheduling a PUSCH, a frequency resource for the PUSCH being allocated within an active UL BWP of the UE; receive a UL CI indicating a UL resource in a reference UL resource, the reference UL resource being allocated within a carrier including at least the active UL BWP; define a starting symbol of the reference UL resource; and in a case that the UL CI is received after the UL grant, determine whether the UL resource overlaps the PUSCH to yield a determination, and in a case that the UL resource overlaps the PUSCH, cancel the PUSCH, wherein the starting symbol is defined as a first symbol after a time duration from an end of the UL CI, and the time duration is defined based on a first time duration of minimum processing for decoding the UL grant and preparing the PUSCH and a second time duration configured by a gNB.

According to a third aspect of the present disclosure, a UE for handling a UL CI is provided. The UE includes one or more processors and at least one memory storing computer-instructions that, when executed by the one or more processors, cause the UE to receive a UL grant scheduling a PUSCH, a frequency resource for the PUSCH being allocated within an active UL BWP of the UE; receive the UL CI, the UL CI indicating a UL resource in a reference UL resource, the reference UL resource being allocated within a carrier including at least the active UL BWP; define a starting symbol of the reference UL resource; and in a case that the UL CI is received after the UL grant, determine whether the UL resource overlaps the PUSCH, and in a case that the UL resource overlaps the PUSCH, cancel the PUSCH, wherein the starting symbol is defined as a first symbol after a time duration from an end of the UL CI, and the time duration is defined based on a first time duration of minimum processing for decoding the UL grant and preparing the PUSCH and a second time duration configured by a gNB.

Various embodiments of the disclosure are discussed in detail below. While specific implementations are discussed, it should be understood that this is done for illustration purposes only. A person skilled in the relevant art will recognize that other components and configurations can be used without parting from the scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one embodiment or an embodiment in the present disclosure can be references to the same embodiment or any embodiment, and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions, will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

Figure 1:
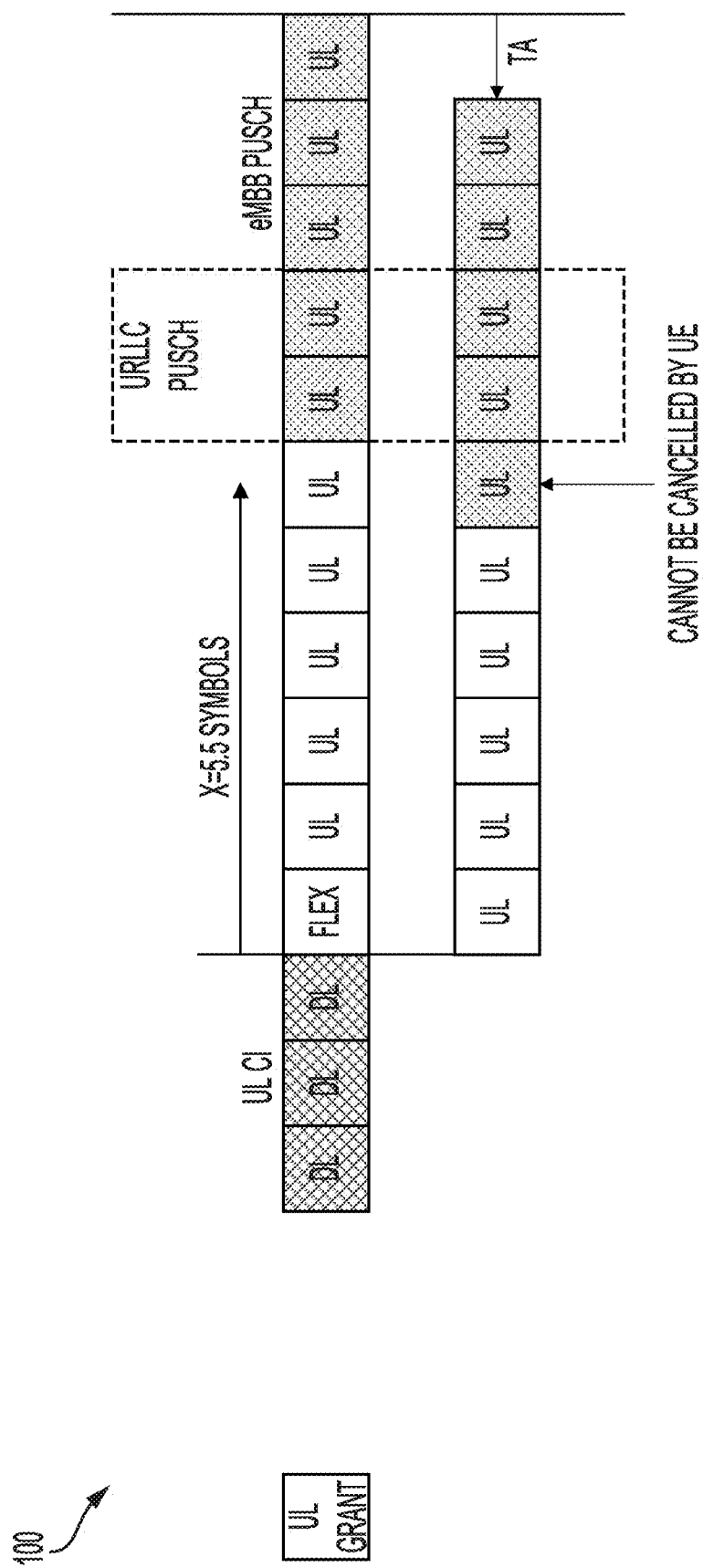
FIG. 1 shows an illustrative example of an environment in which starting symbols in a reference UL resource (RUR) are not cancelled by the UE as a result of the PUSCH having already been transmitted according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability, or configuration of the disclosure. Rather, the ensuing description of the preferred examples of embodiment(s) will provide those skilled in the art with an enabling description for implementing preferred examples of embodiments. It is understood that various changes can be made in the function and arrangement of elements without departing from the scope as set forth in the appended claims.

General Aspects

There is a need in the art for an approach to guarantee that latency requirements for a URLLC service are met, particularly when resources scheduled for eMBB traffic need to be re assigned for URLLC traffic. In Rel-15 NR, a downlink pre-emption indication (PI) was specified for this purpose. As noted above, the downlink (DL) pre-emption indication (PI) is transmitted to the eMBB user equipment (UE) to indicate that part of the resources of the scheduled transport blocks (TB) are to be used for transmission of another TB for URLLC.

The same problem as described above with respect to the downlink may happen in uplink as well, where a gNodeB (gNB) needs to schedule URLLC traffic in a short latency bound when all available resources are already scheduled for eMBB traffic. In principle, an uplink (UL) PI or an uplink cancellation indication (CI) may be transmitted to the eMBB UE. The eMBB UE can then cancel the scheduled transmission according to the uplink CI. The fundamental differences between the DL case and UL case are, in the DL case, the DL PI may be transmitted after preemption of eMBB resources happens, since it is the gNB that is in charge of mapping URLLC traffic to the preempted eMBB resource. However, in the UL case, the cancellation indication (CI) needs to be transmitted before preemption happens, since it is the eMBB UE's job to cancel the uplink transmission. Therefore, issues related to UE behavior for monitoring UL CI, determination of reference time, and frequency resource need to be considered. For example, the improved process should take into account the nature of uplink cancellation. That is, the UE needs to decode the uplink CI successfully before cancellation of uplink transmission happens. In addition, there are some issues that do not occur in the downlink case. For example, when uplink control information (UCI) is multiplexed into a Physical Uplink Shared Channel (PUSCH) which is cancelled by an uplink CI, and if the physical uplink control channel (PUCCH) of the UCI is not cancelled by the uplink CI, the UE behavior for the PUCCH needs to be defined.

Problems

UL CI Monitoring

To reduce the burden of an eMBB UE for monitoring UL CI, the eMBB UE may only monitor UL CI after decoding a UL grant addressed to the eMBB UE. There are three issues that need to be solved. The first issue is when a UE has both eMBB and URLLC traffic, the monitoring behavior needs to be defined so that UL CI only cancels resources scheduled for eMBB traffic. The second issue is that, if an eMBB UE starts to monitor UL CI after decoding a UL grant addressed to it, the gNB may not be able to preempt the scheduled transmission if the time offset from the UL grant and the scheduled transmission is relatively small. The third issue is related to the stopping condition for monitoring UL CI. For instance, there is currently no requirement or rule for the UE to stop monitoring UL CI when there is no need to monitor UL CI anymore. For example, the UE should not monitor a search space for UL CI if the resources that will potentially be preempted by the UL CI do not overlap with the scheduled UL resources for the UE.

Reference UL Resource

Indication of a preempted resource in UL CI will be based on a configured reference UL resource (RUR). The bits in UL CI will indicate which part of the resources in the RUR are to be preempted. For the reference time region of the RUR, the starting symbol may be defined as the earliest symbol on which a UE can cancel its transmission after receiving the UL CI. When defining the earliest symbol, the effect of UE processing time of UL CI and timing advance (TA) should be taken into account. Another issue to be addressed is which kinds of symbols are considered as valid symbols for RUR. For determining the time duration of reference time region, it may be configured by explicit radio resource control (RRC) parameter, e.g., 2 symbols, 4 symbols, etc. The system should address whether the configured number of symbols takes into account only UL symbols or other kinds of symbols are also taken into account. The system can determine, for the reference frequency region of RUR, whether to follow the Rel-15 method for DL PI, e.g., the reference frequency region is the active bandwidth part (BWP). It may be straightforward to reuse the same method. Other methods can be applied as well. The fundamental difference between DL and UL can be considered.

Handling UCI on Pre-Empted PUSCH

In some scenarios, a PUSCH may be scheduled to be overlapped in time with a PUCCH, according to current specification, e.g., TS 38.213 v.15.7.0, the UCI of the PUCCH will be multiplexed in the PUSCH. Now, if the PUSCH is to be canceled by the UE according to the UL CI, the UE needs to decide whether the UCI can be transmitted on the PUCCH. A rule should be defined for the UE to transmit or drop the PUCCH according to the timeline condition of the UL CI, PUSCH, and PUCCH so that UCI can be transmitted without increasing UE complexity.

Implementation Summary

To deal with the aforementioned issues, the following embodiments are proposed. Disclosed embodiments provide a framework rescheduling traffic for improved efficiency using a cellular network. An example method includes receiving at a user equipment (UE) an uplink (UL) grant, wherein the UL grant schedules a Physical Uplink Shared Channel (PUSCH). A frequency resource for the PUSCH can be allocated within an active UL Bandwidth Part (BWP) of the UE. The frequency resource is allocated using a physical resource block (PRB) index of the active UL BWP. The method includes receiving a UL cancellation indication (CI), wherein the UL CI indicates a UL resource in a reference UL resource, and wherein the reference UL resource is allocated within a carrier including at least the active UL BWP. The frequency resource is allocated using a common resource block (CRB) index of the carrier. The method further includes determining whether the UL resource overlaps with the PUSCH to yield a determination and cancelling the PUSCH when the determination indicates that the UL resource overlaps with the PUSCH. These processes in one aspect can be performed on the UE and in another aspect, one or more processes can be performed on one or more of the UE or the gNB.

Another aspect from the standpoint for the gNB can include transmitting to a user equipment (UE) an uplink (UL) grant, wherein the UL grant schedules a Physical Uplink Shared Channel (PUSCH). A frequency resource for the PUSCH can be allocated within an active UL Bandwidth Part (BWP) of the UE. The frequency resource is allocated using a physical resource block (PRB) index of the active UL BWP. The method can include transmitting to the UE a UL cancellation indication (CI), wherein the UL CI indicates a UL resource in a reference UL resource, and wherein the reference UL resource is allocated within a carrier including at least the active UL BWP. The frequency resource is allocated using a common resource block (CRB) index of the carrier. The method further includes receiving data from the UE in which the UE determined whether the UL resource overlaps with the PUSCH to yield a determination and cancelling the PUSCH when the determination indicates that the UL resource overlaps with the PUSCH. The data received at the gNB can represent the data transmitted, if at all, from the UE in view of the cancellation of the PUSCH.

UL CI Monitoring

For the first issue related to UL CI monitoring described above, the following method is proposed. A UE starts to monitor for a UL CI after decoding a UL grant with a "low priority" indication. For a configured grant (CG), a UE only monitors the monitoring occasions of the search space for a UL CI with associated RUR overlapping with the CG resource.

For the second issue related to UL CI monitoring described above, the following method is proposed. A UE monitors a search space for a UL CI if the associated RUR overlaps with a potentially scheduled PUSCH for the UE. For this method, the UE may determine whether there may be a PUSCH overlapping with the RUR based on the time domain resource allocation table used by the UE. If it is determined that the associated RUR of a search space for a UL CI overlaps with a potentially scheduled PUSCH, it is monitored before decoding a UL grant.

For the third issue related to UL CI monitoring described above, the following method is proposed. A UE stops monitoring for a UL CI if it receives a UL grant with "high priority" indication. For a CG, a UE stops monitoring for a UL CI after selecting a UL CG configured as high priority by an RRC parameter.

Reference UL Resource

Figure 2:
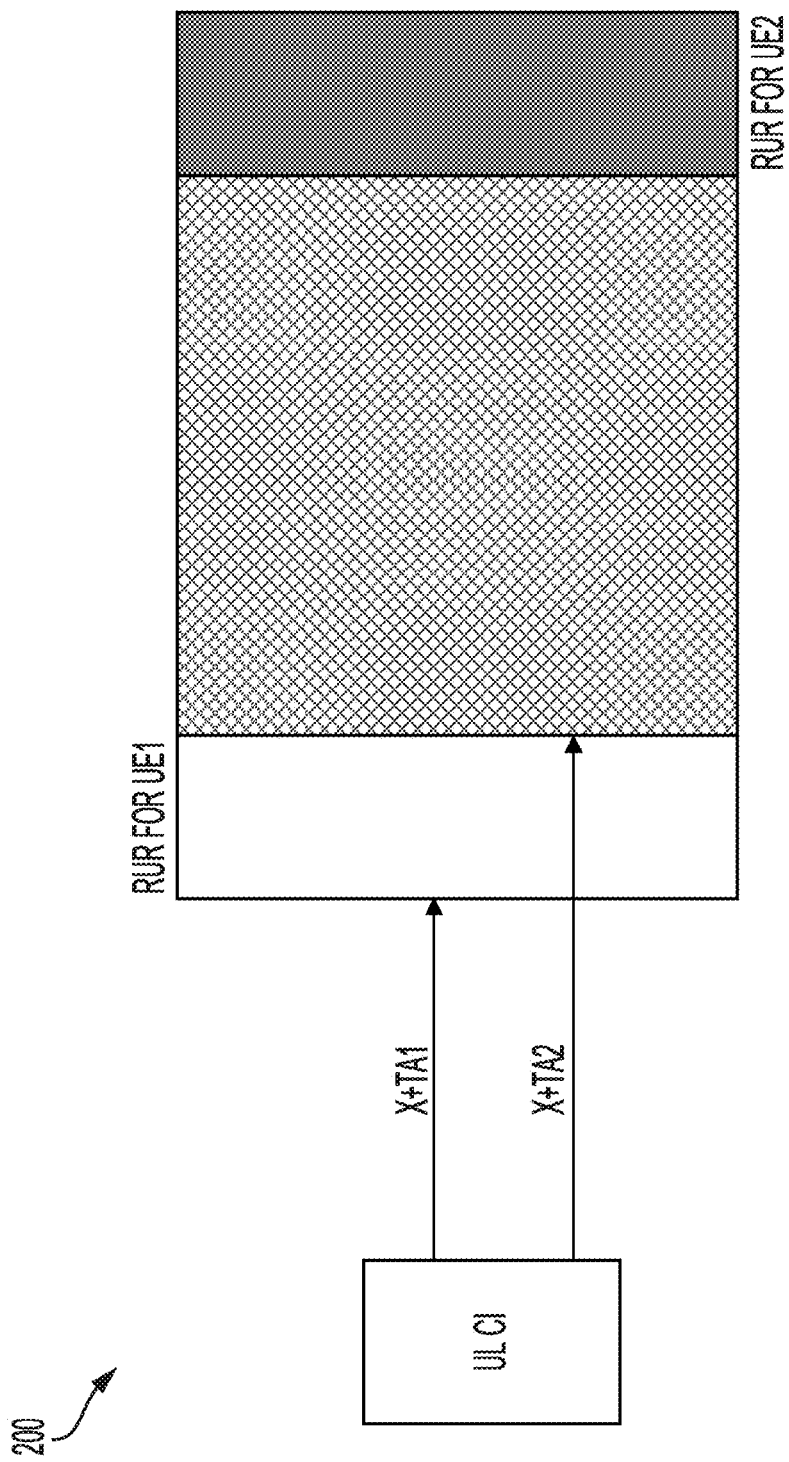
FIG. 2 shows an illustrative example of an environment in which a reference time region is not aligned between multiple UEs as a result of the timing advance (TA) of the multiple UEs being different according to various embodiments.

For determining the starting symbol of an RUR, the following method is proposed with reference to the framework 100 shown in FIG. 1. The starting symbol of the RUR of a UL CI is the first symbol after a time duration of minimum processing time (denoted by X as shown in the framework 200 of FIG. 2) of the UL CI and a timing advance (TA, also shown in FIG. 2), counting from the end of the search space of the corresponding UL CI. The minimum processing time is the time duration the UE needs for decoding the UL CI, and prepare for cancelling the UL transmission. The timing advance (TA) can be taken into account for determining the RUR to make sure all the resources in the RUR may be cancelled by the UE. If the TA is not taken into account, the starting symbols in the RUR may not be cancelled by the UE since by the time UE finished decoding of the UL CI and prepared for UL cancellation, the PUSCH may have already been transmitted (see FIG. 1). Since there may be multiple UEs configured with the same bits in the UL CI, if the effect of the TA is implicitly taken into account by the UE when determining the starting symbol of the RUR, the reference time region may not be aligned between multiple UEs if the TA of multiple UEs are different (see FIG. 2, the RUR of UE1 is the leftmost white coloured region and the middle gray-colored region, and the RUR of UE2 is the middle gray-colored region and the rightmost dark gray-coloured region). To resolve this issue, a reference TA may be configured for the multiple UEs for determining the starting symbol of the RUR. The reference TA is configured to be larger than the TA of the multiple UEs, so that the RUR is aligned for the multiple UEs.

For determining the reference time region of the RUR, the following method is proposed. The reference time region is defined as the UL symbols and the semi-static flexible symbols within the configured time duration, e.g., 2 symbols, 4 symbols, etc., starting from the starting symbol of the RUR. The semi-static downlink symbols are excluded from the RUR so that the actual reference time region will be smaller than the RRC configured duration of the reference time region. To better utilize the number of bits in UL CI, finer granularity of the UL CI may be achieved as the following. The configured number of bits for indicating time domain resources in the UL CI can be divided into two parts, where each bit in the first part may indicate a fewer number of symbols than the RRC configured number of symbols, while each bit in the second part may indicate a number of symbols that is RRC-configured. The method for determining the number of bits in each part may be based on the number of bits for indicating a time domain resource in the UL CI and the number of symbols in the RUR after excluding semi-static downlink symbols. For example, if the RRC-configured granularity is 2 symbols, and the number of bits for time resource indication in the UL CI is 7 bits, and the number of symbols in the RUR after excluding semi-static DL symbols is 10 (denoted as $N_{RUR}$), then the first $$\left(7 - N_{RUR} + \left\lfloor \frac{N_{RUR}}{7} \right\rfloor \cdot 7\right)$$

bits are divided into the first part, with each bit indicating $$\left\lfloor \frac{N_{RUR}}{7} \right\rfloor$$

symbols. The last $$\left(N_{RUR} - \left\lfloor \frac{N_{RUR}}{7} \right\rfloor \cdot 7\right)$$

bits are divided into the second part, with each bit indicating $$\left\lceil \frac{N_{RUR}}{7} \right\rceil$$

symbols. The finer granularity may be beneficial for resource utilization since unnecessary preemption may be avoided. The bits with finer granularity are used to indicate the symbols closer to the UL CI, while the bits with coarser granularity are used to indicate the symbols farther from the UL CI, since the gNB may have a better picture of how to perform scheduling on the more recent symbols.

Note that the semi-static downlink, flexible, and uplink symbols are the symbols configured as downlink, flexible, and uplink, respectively, in TDD-UL-DL-Configuration-Common or TDD-UL-DL-ConfigurationDedicated, if provided by the gNB.

For determining the reference frequency region of the RUR, the following method is proposed. The reference frequency region of the RUR is determined as the active UL BWP of the UE. For this method, the gNB may need to configure the same size of UL BWP for the UEs configured with the same bits for the serving cell in UL CI. There is one issue to be solved for this method. When it is in a paired spectrum, and when the gNB indicates to the UE to switch UL BWP, the UE does not switch DL BWP. Therefore, the same UL CI search space is monitored after the UE switched UL BWP. Since the UE determines the reference frequency region as the active UL BWP, the gNB will need to switch all the UEs configured with the same bits for the serving cell in the UL CI to the same BWP. Otherwise, the UE will misinterpret the UL CI if the gNB sets the UL CI based on active UL BWP of the other UEs. To resolve this issue, UL CI should be able to be configured with specific bits for different UL BWPs. That is, a BWP-Id may be configured with a corresponding positionInDCI in the UL CI configuration. With this method, the UE may monitor the same UL CI search space after UL BWP switching, and the UE can use the bits configured for the new UL BWP for UL CI interpretation, and the reference frequency region is the new active UL BWP. In case the UE switches to a UL BWP without corresponding bits in the UL CI, the UE still uses the bits configured for the UL BWP before BWP switching for UL CI interpretation, and the reference frequency region is the UL BWP before BWP switching. For the granularity of frequency resource indication, it may be determined based on the configured number of bits for frequency resource indication and the size of reference frequency region.

Handling UCI on Pre-empted PUSCH

Figure 3:
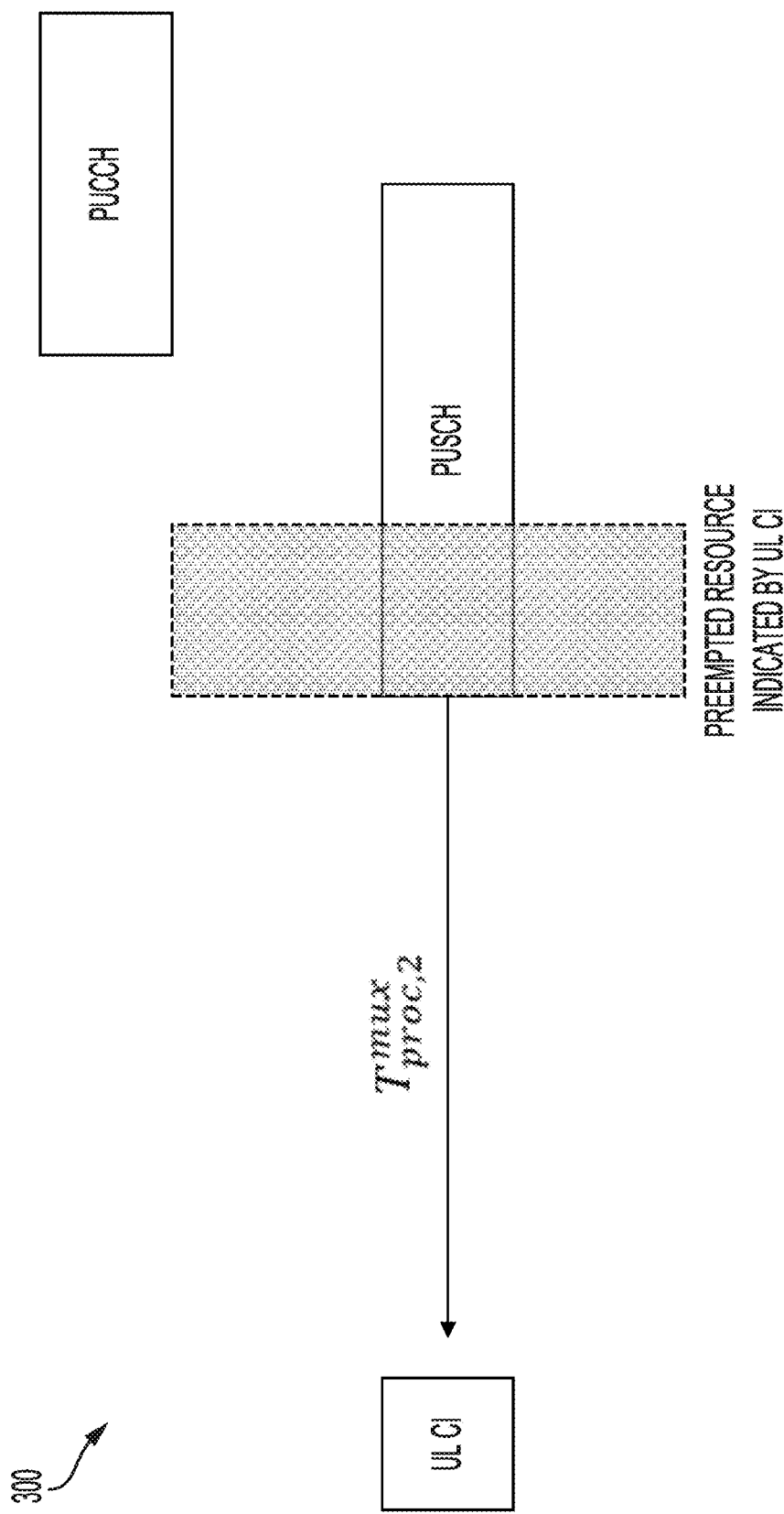
FIG. 3 shows an illustrative example of an environment in which uplink control information (UCI) is transmitted on a PUSCH as a result of a time duration from an end of a UL CI to an earliest symbol of the overlapping PUSCH and physical uplink control channel (PUCCH) is equal or larger than $T_{proc,2}^{mux}$ according to various embodiments.

For the case where a PUSCH is overlapping with a PUCCH, and the PUSCH is preempted by a UL CI, the following method is proposed. To avoid unnecessary dropping of the PUCCH, a timeline condition can be defined for the UE to determine whether to drop the PUCCH or transmit the PUCCH. To achieve the purpose without increasing the complexity of an eMBB UE, the Rel-15 timeline requirement for UCI multiplexing may be used. As shown in an example framework 300 shown in FIG. 3, if the time duration from the end of the UL CI to the earliest symbol of the overlapping PUSCH and PUCCH is equal or larger than $T_{proc,2}^{mux}$, then the UCI can be transmitted on the PUCCH. Since $T_{proc,2}^{mux}$ defines the minimum processing time for the UE to make the multiplexing decision for overlapping PUSCH and PUCCH, it is reasonable that the same amount of time may apply in this scenario, where the UE decides not to transmit PUSCH and transmits PUCCH instead. On the other hand, if the time duration from the end of the UL CI to the earliest symbol of the overlapping PUSCH and PUCCH is less than $T_{proc,2}^{mux}$, the PUCCH should not be transmitted.

Detailed Implementation
UL CI Monitoring

For a UE with both eMBB and URLLC traffic, the UE should not expect a scheduled PUSCH for URLLC traffic to be preempted. The following method may be used to avoid unnecessary UL CI monitoring. For this first method, the UE should start to monitor for a UL CI after decoding a UL grant with "low priority" indication. The priority indication for dynamic grant (DG) PUSCH may be in the form of the following options:

Option 1: By downlink control information (DCI) format
Option 2: By radio network temporary identifier (RNTI)
Option 3: By explicit indication in DCI (new field or reuse existing field)
Option 4: By Control Resource Set (CORESET)/search space For a configured grant (CG), the UE only monitors the monitoring occasions of the search space for a UL CI with associated RUR overlapping with the CG resource having a CG configuration of low priority. A configured grant Type 1 is an uplink grant provided by the RRC and stored as a configured uplink grant. A configured grant Type 2 is where an uplink grant is provided by the physical downlink control channel (PDCCH) and stored or cleared as a configured uplink grant based on a physical layer signaling indicating configured grant activation or deactivation. For a Type 1 CG, the priority may be configured by an explicit RRC information element (IE). For Type 2 CG, the priority may be configured by an explicit RRC IE. In one alternative, the priority of a Type 2 CG may also be indicated by the activation DCI of the Type 2 CG. In one alternative, the priority of a Type 2 CG may be configured by an explicit RRC IE, and the priority indication in the activation DCI may overwrite the priority configured by the RRC IE.

In an embodiment, when a CG resource is not allowed to be used for transmission of a new TB, e.g., when configuredGrantTimer of the corresponding Hybrid Automatic Repeat Request (HARQ) process of the resource is running, the UE does not monitor search spaces for a UL CI with associated RUR overlapping with the CG resource regardless of the priority of the CG resource.

In the situation where an eMBB PUSCH is scheduled with short time duration between the end of PDCCH containing UL grant to the start of PUSCH, the gNB may not be able to preempt the scheduled PUSCH if the UE only starts to monitor for a UL CI after decoding the UL grant. The following method may be used to resolve the issue.

A UE monitors monitoring occasions of the search space for a UL CI if the associated RUR overlaps with a potentially scheduled PUSCH for the UE. For this method, the UE may determine whether there may be a PUSCH overlapping with the RUR based on one or more of the following: time domain resource allocation (TDRA) table used by the UE, processingType2Enabled in PUSCH-ServingCellConfig, and minimum applicable K2. K2 is a time domain resource assignment and various values are shown below in Table 1. If it is determined that the associated RUR of a search space for UL CI overlaps with a potentially scheduled PUSCH, it is monitored before decoding a UL grant.

A TDRA table may be configured by pusch-TimeDomain-AllocationList. A UE uses a default TDRA table if pusch-TimeDomainAllocationList is configured neither in pusch-ConfigCommon nor in pusch-Config. If pusch-TimeDomainAllocationList is configured both in pusch-ConfigCommon and in pusch-Config, the pusch-TimeDomainAllocationList in pusch-Config is used.

In the following example, it is assumed that the TDRA table is configured in pusch-Config as shown below in Table 1, processingType2Enabled in PUSCH-ServingCellConfig is configured, SCS is 30 kHz, and minimum applicable K2 is 0. The search space for a UL grant is configured to be associated with a 2-symbol CORESET and periodicity of one slot. The search space configuration for a UL CI is configured to be associated with a 2-symbol CORESET, periodicity of one slot, and 7 monitoring occasions in one slot. The duration of an RUR is assumed to be 4 symbols. Since processingType2Enabled in PUSCH-ServingCellConfig is configured, the minimum processing time for PUSCH preparation is 5.5 symbols. Therefore, a PUSCH may be scheduled to start at symbol 8 in the same slot as the UL grant, assuming TA is negligible.

TABLE 1

| Row index | PUSCH mapping type | $K_2$ | S | L |
| --- | --- | --- | --- | --- |
| 1 | Type B | 0 | 8 | 4 |
| 2 | Type B | 0 | 8 | 6 |
| 3 | Type B | 0 | 10 | 4 |
| 4 | Type A | 1 | 0 | 6 |
| 5 | Type A | 1 | 0 | 8 |
| 6 | Type A | 1 | 0 | 10 |
| 7 | Type B | 1 | 4 | 6 |
| 8 | Type B | 1 | 4 | 8 |

For the above configuration, all rows in the TDRA table may be used for scheduling a PUSCH. Since the processing time of a UL grant may be assumed to be not larger than N2 symbols (capability 2), whether to monitor the fifth, sixth, and seventh monitoring occasions of the search space for UL CI in a slot may be based on whether the associated RUR is overlapped with a scheduled PUSCH after determining if there is a UL grant in the slot. That is, the UE may skip the following monitoring occasions of the search space for a UL CI until the next monitoring occasion of the search space for a UL grant, if the UE determines there is no UL grant in a search space, or a UL grant is decoded and the associated RUR of the monitoring occasions of the search spaces for a UL CI do not overlap with the PUSCH scheduled by the UL grant. For other monitoring occasions of the search space for UL CI, whether to do monitoring may be based on whether there may be potential PUSCH overlapping with the associated RUR.

With further reference to Table 1, the first monitoring occasion of the search space for a UL CI in a slot can have an associated RUR overlapping with a PUSCH scheduled by a UL grant in the slot, using row 1, row 2, or row 3. The second monitoring occasion of the search space for a UL CI in a slot has an associated RUR overlapping with a PUSCH scheduled by a UL grant in the slot, using row 1, row 2, or row 3. The third monitoring occasion of the search space for a UL CI in a slot has an associated RUR overlapping with a PUSCH scheduled by a UL grant in the slot, using row 2, row 3, row 4, row 5, or row 6. The fourth monitoring occasion of the search space for a UL CI in a slot has an associated RUR overlapping with a PUSCH scheduled by a UL grant in the slot, using row 4, row 5, or row 6. Therefore, the first 4 monitoring occasions of the search space for the UL CI in a slot should be monitored if the UE attempts to monitor the search space for a UL grant in the slot.

Note that in this example, the first monitoring occasion of the search space for a UL CI in a slot starts at the same time as the search space for a UL grant. Since it does not make sense for the gNB to schedule a PUSCH and preempt a PUSCH at the same time, the UE may not need to monitor the first monitoring occasion of the search space for a UL CI. Therefore, the UE may not monitor a monitoring occasion of the search space for a UL CI if it has the same starting symbol as the search space for a UL grant.

In one embodiment, the UE starts UL CI monitoring upon attempting to decode UL grant, if processingType2Enabled in PUSCH-ServingCellConfig is configured. Otherwise, the UE starts UL CI monitoring after decoding a UL grant with "low priority" indication.

Figure 4:
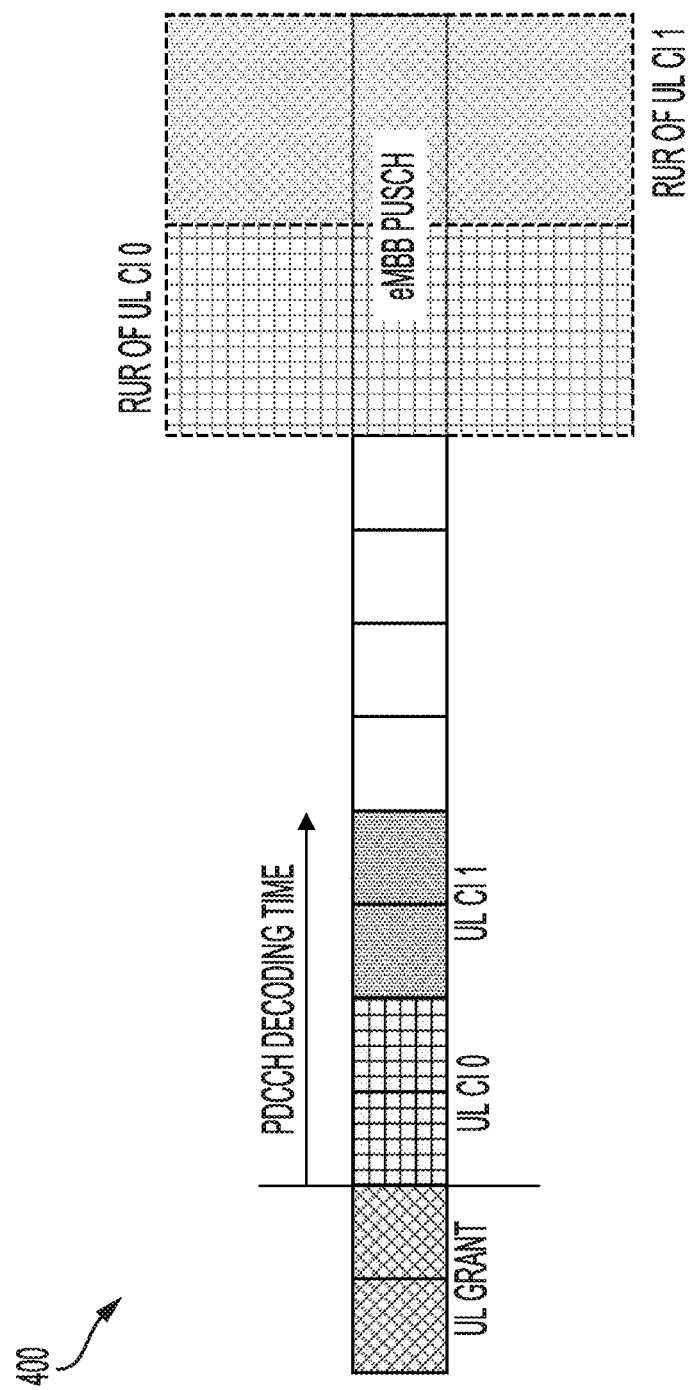
FIG. 4 shows an illustrative example of an environment in which PDCCH decoding time is defined as symbols for subcarrier spacing (SCS) according to various embodiments.

In one embodiment, a PDCCH decoding time duration is defined. The search space for a UL CI can be monitored by the UE, if the search space for a UL CI is with a starting symbol after the starting symbol of the search space for a UL grant and with a starting symbol starting within the PDCCH decoding time duration counting from the end of the search space for a UL grant. The PDCCH decoding time may be defined in number of symbols, e.g., PDCCH decoding time may be defined as 2, 4, 8 symbols for SCS of 15 kHz, 30 kHz, and 60 kHz, respectively. An example is shown in the framework 400 of FIG. 4. Since the monitoring occasion 0 of the search space for a UL CI and monitoring occasion 1 of the search space for a UL CI is within the PDCCH decoding time, it is monitored by the UE. Otherwise, the eMBB PUSCH may not be able to be preempted by the gNB.

In one embodiment, the UE does not monitor the monitoring occasions of the search space for a UL CI starting within the PDCCH decoding time. In another embodiment, whether the UE monitors the monitoring occasions of the search space for a UL CI starting within the PDCCH decoding time is based on the reported UE capability. The UE capability may explicitly indicate whether the UE is able to monitor the monitoring occasions of the search space for a UL CI within the PDCCH decoding time of UL grants or not. Whether the UE monitors the monitoring occasions of the search space for a UL CI starting within the PDCCH decoding time can also be determined based on one or more other factors as well.

After starting to monitor for a UL CI based on the methods described above, the UE may not need to keep monitoring for a UL CI if one or more conditions are met. The following method may be used to determine whether to keep or stop monitoring for a UL CI. After the UE received a UL CI, it determines if the preempted resource indicated in the UL CI overlaps with the PUSCH scheduled by a UL grant. Since the PUSCH will be cancelled by the UE if the PUSCH overlaps with the indicated resource, the UE may stop monitoring for a UL CI. In one alternative, if the indicated resource in a UL CI overlaps with part of the repetitions of the PUSCH, and there are monitoring occasions of the search space for a UL CI with associated RUR overlapping with the other repetitions of the PUSCH that are not preempted, the UE can keep monitoring for a UL CI. In one alternative, if the indicated resource in the UL CI overlaps with part of the symbols of a sounding reference signal (SRS) transmission, and there are monitoring occasions of the search space for a UL CI with associated RUR overlapping with the other symbols of the SRS transmission that are not preempted, the UE keeps monitoring for a UL CI.

For the stopping conditions of UL CI monitoring, the following conditions may be applied. In one embodiment, a UE stops monitoring for a UL CI if it receives a UL grant with "high priority" indication. Alternatively, in an embodiment, a UE stops monitoring for a UL CI if it receives a UL grant scheduling a PUSCH with a starting symbol earlier than the starting symbol of another PUSCH scheduled by another UL grant with a starting symbol earlier than the starting symbol of the UL grant. In one alternative embodiment, a UE stops monitoring for a UL CI if it receives a UL grant with "high priority" indication. In one alternative embodiment, a UE stops monitoring for a UL CI if a random access procedure is initiated. For CG, a UE stops monitoring for a UL CI after selecting a UL CG configured as high priority by an RRC parameter.

The combination of the above methods may be used to determine whether to start UL CI monitoring or stop UL CI monitoring. In some cases, a PUSCH with "high priority" is scheduled and a UL CI is received, indicating preemption of part of the PUSCH resource. The following method may be used to determine whether to apply the UL CI. In one embodiment, the UL CI only applies to a PUSCH with "low priority" indication, or some other indicator or label. Alternatively, in one embodiment, the UL CI applies to a PUSCH scheduled by a UL grant with an earlier starting symbol than that of the UL CI. For CG selection, in case a UL CI is received indicating a preempted resource overlapping with a CG, the UE does not select the CG. The physical layer can pass the UL CI to the MAC layer after decoding of the UL CI. The MAC layer can take into account the UL CI when selecting the CG.

Reference UL Resource

As noted above, if the TA is not considered when determining the starting symbol of the RUR, the UE may not be able to cancel the starting symbols of the RUR. The following method is proposed for determining the starting symbol of the RUR. The starting symbol of the RUR of a UL CI can be the first symbol after a time duration of minimum processing time of the UL CI and timing advance, counting from the end of the search space of the corresponding UL CI. The minimum processing time is the time duration the UE needs for decoding the UL CI and prepare for cancelling the UL transmission. The time duration of minimum processing time is the $T_{proc,2} = \max((N_2+d_{2,1})(2048+144) \cdot \kappa 2^{-\mu} \cdot T_C, d_{2,2})$ defined in TS 38.214 V15.7.0, where N2 is based on $\mu$ of Table 6.4-2 for UE processing capability 2, where $\mu$ corresponds to the one of ($\mu$DL, $\mu$UL) resulting with the largest $T_{proc,2}$, where the $\mu$DL corresponds to the subcarrier spacing of the downlink with which the PDCCH carrying the UL CI was transmitted and $\mu$UL corresponds to the subcarrier spacing of the uplink channel to which a number of bits starting from positionInDCI in UL CI is applied, and x is defined in subclause 4.1 of TS 38.211 V15.7.0. These standards documents are incorporated herein by reference.

In an embodiment, the starting symbol of the RUR of a UL CI is the first symbol after a time duration of minimum processing time of the UL CI and timing advance, counting from the end of the search space of the corresponding UL CI. The minimum processing time is the time duration the UE needs for decoding the UL CI and preparing for cancelling the UL transmission. The time duration of minimum processing time is, for example, the minimum processing time for decoding a UL grant and preparing a corresponding PUSCH, e.g., $T_{proc,2} = \max((N_2+d_{2,1})(2048+144) \cdot \kappa 2^{-\mu} \cdot T_C, d_{2,2})$ defined in TS 38.214 V15.7.0, where N2 is based on $\mu$ of Table 6.4-2 for UE processing capability 2, where $\mu$ is the smallest $\mu$ from ($\mu$DL, $\mu$UL), where the $\mu$DL corresponds to the subcarrier spacing of the downlink with which the PDCCH carrying the UL CI was transmitted and $\mu$UL corresponds to the subcarrier spacing of the uplink channel to which a number of bits starting from positionInDCI in the UL CI is applied, and x is defined in subclause 4.1 of TS 38.211 V15.7.0. The time duration of the minimum processing time could be other values as well.

The starting symbol of the RUR is determined as the next symbol with its cyclic prefix (CP) starting $T_{proc,2}+TA_{ref}$ after the end of the reception of the last symbol of the PDCCH carrying the UL CI cancelling the PUSCH. Note that the symbol timing is before applying the TA. Note that for determining the starting symbol of the RUR, the subcarrier spacing (SCS) for symbol timing determination may be based on the following methods. In an embodiment, the SCS for symbol timing determination is based on the SCS of the active BWP.

For determining the active UL BWP on a UL carrier in case of UL BWP switching in the above embodiment, the following method may be used. In one embodiment, the active UL BWP for a UL CI is the UL BWP indicated in a UL grant with starting symbol earlier than the starting symbols of the UL CI. Alternatively, in an embodiment, the active UL BWP for a UL CI is the UL BWP in which the last PUSCH is transmitted or the UL BWP indicated by a received RRC message or the UL BWP UE switches to after BWPInactivityTimer expires, whichever occurs last. The PUSCH or RRC message can end before the start of the UL CI. In an embodiment, for determining the SCS for symbol timing determination, the SCS for a UL carrier is determined as a specific configured SCS, which may be configured together with an RUR configuration. Alternatively, in an embodiment, for determining the SCS for symbol timing determination, the SCS is determined as the SCS of the UL BWP with the same BWP-Id as the DL BWP where the UE receives the UL CI.

For determination of time duration $TA_{ref}$, the following embodiments may be used. For instance, in an embodiment, the UE uses the latest TA which is adjusted based on the last received TA command. For this alternative, it is up to the gNB to ensure the UEs configured with the same bits in the UL CI have the same starting symbol of the RUR. As another example, in an embodiment, the UE assumes $TA_{ref}$ is 0. In this case, it is up to the gNB to ensure the reliability of other UE's URLLC PUSCH if the UL CI indicates UL symbols that cannot be cancelled by the UE. For example, the system may determine not to schedule eMBB PUSCH for a UE with a large TA if there is no proper UL CI monitoring occasion that can be used to preempt the PUSCH. If a UE receives a UL CI indicating UL symbols in which PUSCH has already been transmitted, the UE does not cancel those symbols, and cancels the PUSCH in the UL symbols indicated to be cancelled that are not yet transmitted.

In one embodiment, the gNB configures $TA_{ref}$ for the UEs. The $TA_{ref}$ is configured with the UL CI configuration. The gNB may group the UEs with a similar range of TA to the same bits in the UL CI and with the same $TA_{ref}$. Alternatively, in an embodiment, the gNB configures $TA_{ref}$ for each timing advance group (TAG). The $TA_{ref}$ is configured with the UL CI configuration. For a UL carrier, the UE uses the $TA_{ref}$ configured for the TAG containing the UL carrier. Alternatively, the UE uses the largest $TA_{ref}$ configured for the TAGS containing the UL carriers configured with associated bits in the UL CI.

In one embodiment, $TA_{ref}$ is determined from a set of values, e.g., 2 symbols, 4 symbols, etc., and the UE determines the value from the set of values based on its TA. For example, the UE determines $TA_{ref}=2$ symbols if its TA is within the range of 0 to 2 symbols, and the UE determines $TA_{ref}=4$ symbol if its TA is within the range of 2 to 4 symbols. The gNB may group the UEs with the same $TA_{ref}$ to the same bits in the UL CI.

In one embodiment, the gNB may configure a specific value of $TA_{ref}$ to be associated with a specific positionInDCI in the UL CI configuration. $TA_{ref}$ may be determined implicitly based on its TA. The UE will only apply the bits starting from the positionInDCI associated with the determined $TA_{ref}$. Note that the $TA_{ref}$ is only for the purpose of determining the starting symbol of the RUR, and it is not used for uplink transmission.

Cross-carrier indication may be used for a UL CI. The content of a UL CI may include an indication of pre-empted resources on multiple carriers, where each uplink carrier is configured with associated bits by configuring the servingCellId of an uplink carrier and the starting position (by positionInDCI) of the bits for the carrier in the UL CI under the same IE, e.g., CI-ConfigurationPerServingCell. In one embodiment, a CI-ConfigurationPerServingCell may include two positionInDCI for the same serving cell: one for normal UL (NUL) carrier and one for supplementary UL (SUL) carrier.

If a UL CI includes information bits for multiple UL carriers, it is possible that the UL carriers have different SCSs for the active UL BWPs or configured UL BWPs. For determining the minimum processing time of the UL CI for a UL carrier, the following method may be used. In one embodiment, the minimum processing time for a UL carrier is determined from the µ corresponding to one of (µDL, µUL) that results in the largest $T_{proc,2}$, where the µDL corresponds to the subcarrier spacing of the downlink with which the PDCCH carrying the UL CI was transmitted and µUL corresponds to the subcarrier spacing of the active UL BWP of the uplink carrier to which a number of bits starting from positionInDCI in the UL CI is applied. Alternatively, in one embodiment, the minimum processing time for a UL carrier is determined based on the smallest µ from (µDL, µUL).

In an embodiment, the minimum processing time for a UL carrier is determined from the µ corresponding to one of (µDL, µUL) resulting in the largest $T_{proc,2}$, where the µDL corresponds to the subcarrier spacing of the downlink with which the PDCCH carrying the UL CI was transmitted and µUL corresponds to the smallest subcarrier spacing of the configured UL BWPs of the uplink carrier to which a number of bits starting from positionInDCI in the UL CI is applied. Alternatively, in an embodiment, the minimum processing time for a UL carrier is determined based on the smallest µ from (µDL, µUL).

In one alternative, the minimum processing time for a UL carrier is determined from the µ corresponding to one of (µDL, µUL) resulting in the largest $T_{proc,2}$, where the µDL corresponds to the subcarrier spacing of the downlink with which the PDCCH carrying the UL CI was transmitted and µUL corresponds to the smallest subcarrier spacing of the active UL BWP of the UL carriers configured with associated bits in the UL CI for the UE. Alternatively, in an embodiment, the minimum processing time for a UL carrier is determined based on the smallest µ from (µDL, µUL).

In one alternative, the minimum processing time for a UL carrier is determined from the µ corresponding to one of (µDL, µUL) resulting with the largest $T_{proc,2}$, where the µDL corresponds to the subcarrier spacing of the downlink with which the PDCCH carrying the UL CI was transmitted and µUL corresponds to the smallest subcarrier spacing of the configured UL BWPs of the UL carriers configured with associated bits in the UL CI for the UE. Alternatively, in an embodiment, the minimum processing time for a UL carrier is determined based on the smallest μ from (μDL, μUL).

For determining the active UL BWP on a UL carrier in case of UL BWP switching in the above alternatives, the following method may be used. In one embodiment, the active UL BWP for a UL CI is the UL BWP indicated in a UL grant with a starting symbol earlier than the starting symbols of the UL CI. Alternatively, in an embodiment, the active UL BWP for a UL CI is the last occurring of the UL BWP in which the last PUSCH is transmitted, the UL BWP indicated by a received RRC message indicating UL BWP switching, and the UL BWP the UE switches to after BWPInactivityTimer expires. Further, the PUSCH or RRC message ends before the start of the UL CI.

In one embodiment, for determining $T_{proc,2}$, the SCS for a UL carrier is determined as a specific configured SCS, which may be configured together with an RUR configuration. Alternatively, in an embodiment, for determining $T_{proc,2}$, the SCS for a UL carrier is determined as the SCS of the DL BWP in which the UL CI is transmitted. In yet another alternative, in an embodiment, for determining $T_{proc,2}$, the SCS is determined as the SCS of the UL BWP with the same BWP-Id as the DL BWP where the UE receives the UL CI.

For determining the reference time region of the RUR, the following method is proposed. The number of bits for cancellation indication for time domain resource for a UL carrier is configured by an RRC parameter together with positionInDCI in CI-ConfigurationPerServingCell. The reference time region is defined as the UL symbols and the semi-static flexible symbols within the configured time duration, e.g., 2 symbols, 4 symbols, etc., counting from the starting symbol of the RUR. The semi-static downlink symbols are excluded from the RUR so that the actual number of symbols in the RUR may be smaller than the RRC configured number of symbols for the RUR. The granularity of each bit for time domain indication in the UL CI is configured by an RRC parameter (e.g., 1 symbol, 2 symbols, 4 symbols, etc.). In one embodiment, the SCS of the symbol is determined as the SCS of the active UL BWP.

For determining the active UL BWP on a UL carrier in case of UL BWP switching in the above alternatives, the following method may be used. In one embodiment, the active UL BWP for a UL CI is the UL BWP indicated in a UL grant with a starting symbol earlier than the starting symbols of the UL CI. Alternatively, in an embodiment, the active UL BWP for a UL CI is the UL BWP in which the last PUSCH is transmitted or the UL BWP indicated by a received RRC message indicating UL BWP switching or the UL BWP UE switches to after BWPInactivityTimer expires, whichever occurs last. Further, the PUSCH or RRC message ends before the start of the UL CI.

In one embodiment, for determining the granularity for time domain indication, the SCS for determination of symbol duration of symbols in a reference UL resource of a UL carrier is determined as a specific configured SCS, which may be configured together with an RUR configuration. Alternatively, in an embodiment, for determining the granularity for time domain indication, the SCS for a UL carrier is determined as the SCS of the DL BWP in which the UL CI is transmitted. As another alternative, in an embodiment, for determining the granularity for time domain indication, the SCS is determined as the SCS of the UL BWP with the same BWP-Id as the DL BWP where UE receives the UL CI.

To better utilize the number of bits in the UL CI, finer granularity of the UL CI may be achieved through the following approach. The configured number of bits for indicating time domain resources in the UL CI is divided into two parts, each bit in the first part may indicate a fewer number of symbols than the RRC configured number of symbols, while each bit in the second part may indicate a number of symbols that is RRC-configured. The method for determining the number of bits in each part may be based on the number of bits for indicating time domain resource in the UL CI and the number of symbols in the RUR after excluding semi-static downlink symbols. For example, if the RRC-configured granularity is 2 symbols, and the number of bits configured for time domain resource indication in the UL CI for the UL carrier is 7 bits, and the number of symbols in the RUR after excluding semi-static DL symbols is 10 (denoted as $T_{RUR}$), then the first $$\left(7 - T_{RUR} + \left\lfloor \frac{T_{RUR}}{7} \right\rfloor \cdot 7 \right) = 4$$

bits are divided into the first part, with each bit indicating $$\left\lfloor \frac{T_{RUR}}{7} \right\rfloor = 1$$

symbols. The last $$\left(T_{RUR} - \left\lfloor \frac{T_{RUR}}{7} \right\rfloor \cdot 7 \right) = 3$$

bits are divided into the second part, with each bit indicating $$\left\lceil \frac{T_{RUR}}{7} \right\rceil = 2$$

symbols. Note that the first part can indicate with finer granularity than the configured granularity.

The finer granularity may be beneficial for resource utilization since unnecessary preemption may be avoided. The bits with finer granularity are used to indicate the symbols closer to the UL CI, while the bits with coarser granularity are used to indicate the symbols farther from the UL CI, since the gNB may have a better picture of how to perform scheduling on the more recent symbols. Note that the semi-static downlink, flexible, and uplink symbols are the symbols configured as downlink, flexible, and uplink, respectively, in TDD-UL-DL-ConfigurationCommon or TDD-UL-DL-ConfigurationDedicated, if provided by the gNB.

For some configurations, the duration of the RUR may be longer than the monitoring periodicity or longer than the time offset between the start times of two consecutive monitoring occasions of the search space for the UL CI. In this case, a UE may receive more than one UL CI with an associated RUR overlapping with a PUSCH. If a symbol is indicated by more than one UL CI, how the UE will interpret the more than one UL CI needs to be defined. The following embodiments may be used. In one embodiment, when a resource element is indicated by more than one UL CI, the UE follows the last UL CI for determining whether the resource element should be cancelled or not. For this alternative, it is possible for a resource element not pre-empted by an earlier UL CI to be pre-empted by a later UL CI. In an embodiment, the UE expects consistent indication in multiple CIs for a resource element, and the UE determines whether to cancel a PUSCH based on the union of the pre-empted resource indicated by the multiple CIs. In an embodiment, when a resource element is indicated by more than one UL CI, the UE follows the UL CI with finer granularity for determining whether the resource element should be cancelled or not.

For some methods or combination of methods above, the granularity of time domain indication may result in the indicated resource to overlap with part of a symbol of a scheduled UL transmission. In this case, the symbol is cancelled, which results in cancelling the whole UL transmission in case of a PUSCH or cancelling the UL transmission on the symbol in case of an SRS.

For determining the reference frequency region of the RUR, the following method is proposed. In one embodiment, the reference frequency region is explicitly configured by RRC parameters. The starting resource block (RB) may be configured based on common resource block indexing, and configured with a specific SCS and type of CP. In an embodiment, the reference frequency region is determined as the initial UL BWP. In another embodiment, the reference frequency region is configured as a specific UL BWP. Alternatively, in an embodiment, the reference frequency region is the UL BWP with the same BWP-Id as the DL BWP where UE receives the UL CI.

In one embodiment, the reference frequency region is determined as the active UL BWP. For determining the active UL BWP on a UL carrier in case of UL BWP switching, the following method may be used. In one embodiment, the active UL BWP for a UL CI is the UL BWP indicated in a UL grant with a starting symbol earlier than the starting symbols of the UL CI. For this embodiment, the active UL BWP for the UL CI may be determined to be the new UL BWP indicated in the UL grant before the scheduled PUSCH. Therefore, the PUSCH scheduled by BWP switching UL grant may be pre-empted.

In one embodiment, the active UL BWP for a UL CI is the UL BWP in which the last PUSCH is transmitted or the UL BWP indicated by a received RRC message indicating UL BWP switching or the UL BWP the UE switches to after BWPInactivityTimer expires, whichever occurs last. Further, the PUSCH or RRC message ends before the start of the UL CI. For this alternative, the RUR is determined based on the UL BWP before BWP switching for the UL CI received before the end of the PUSCH. Therefore, a PUSCH scheduled by a BWP switching UL grant may not be pre-empted if the PUSCH does not overlap with the UL BWP before BWP switching.

For some combinations of the above methods, a UL CI may be configured with a specific number of bits for different UL BWPs. That is, a BWP-Id may be configured with a corresponding positionInDCI in the UL CI configuration. In case of UL BWP switching, the UE may monitor the same UL CI search space after UL BWP switching, and the UE will use the bits configured for the new UL BWP for UL CI interpretation, and the reference frequency region is the new active UL BWP. In case the UE switches to a UL BWP without corresponding bits in the UL CI, the UE still uses the bits configured for the UL BWP before BWP switching for UL CI interpretation, and the reference frequency region is the UL BWP before BWP switching. For some methods or combination of methods above, the granularity of frequency domain indication may result in an indicated resource to overlap with part of a subcarrier of a scheduled UL transmission. In this case, the UL transmission is cancelled by the UE.

For indication of a frequency domain resource, the number of bits for cancellation indication for a frequency domain resource for a UL carrier may be configured by an RRC parameter together with positionInDCI in CI-Configuration-PerServingCell. In one embodiment, the granularity of frequency domain resource indication is determined by the number of bits configured for frequency domain resource indication. For example, assuming a number of bits configured for frequency domain resource indication in the UL CI for the UL carrier is 7 bits, and the number of PRBs in the RUR is 51 (denoted as $F_{RUR}$), then the first $$\left(7 - F_{RUR} + \left\lfloor \frac{F_{RUR}}{7} \right\rfloor \cdot 7\right) = 5$$

bits has a granularity of $$\left\lfloor \frac{F_{RUR}}{7} \right\rfloor = 7$$

PRBs. The last $$\left(F_{RUR} - \left\lfloor \frac{F_{RUR}}{7} \right\rfloor \cdot 7\right) = 2$$

bits has a granularity of $$\left\lceil \frac{T_{RUR}}{7} \right\rceil = 8$$

PRBs.

In one alternative, the number of bits for cancellation indication for a time domain resource and a frequency domain resource for a UL carrier is configured by an RRC parameter together with positionInDCI in CI-Configuration-PerServingCell. The granularity of each bit for a time domain indication in the UL CI is configured by an RRC parameter. To determine the number of bits used for indicating a time domain resource, it may be calculated based on the number of symbols in the configured time duration of an RUR after excluding semi-static DL symbols, denoted as $T_{RUR}$, and the granularity of time domain resource indication, e.g.

$$T_{CI} = \left\lceil \frac{T_{RUR}}{\text{granularity}} \right\rceil.$$

Then each bit of the first $$\left(T_{CI} - T_{RUR} + \left\lfloor \frac{T_{RUR}}{T_{CI}} \right\rfloor \cdot T_{CI}\right)$$

bits indicates $$\left\lfloor \frac{T_{RUR}}{T_{CI}} \right\rfloor$$

symbols, and each bit of the last $$\left(T_{RUR} - \left\lfloor \frac{T_{RUR}}{T_{CI}} \right\rfloor \cdot T_{CI}\right)$$

bits indicates $$\left\lceil \frac{T_{RUR}}{T_{CI}} \right\rceil$$

symbols. The rest of the bits are used for indicating a frequency domain resource, e.g., $F_{CI}$=total number of bits–$T_{CI}$. Each bit of the first $$\left(F_{CI} - F_{RUR} + \left\lfloor \frac{F_{RUR}}{F_{CI}} \right\rfloor \cdot F_{CI}\right)$$

bits has a granularity of $$\left\lfloor \frac{F_{RUR}}{F_{CI}} \right\rfloor$$

PRBs, and each bit of the last $$\left(F_{RUR} - \left\lfloor \frac{F_{RUR}}{F_{CI}} \right\rfloor \cdot F_{CI}\right)$$

bits has a granularity of $$\left\lceil \frac{T_{RUR}}{F_{CI}} \right\rceil$$

PRBs. If $F_{CI}$=0, the whole frequency region of the RUR is indicated as preempted. In methods and combination of methods above, the preempted resource is the union of the indicated time domain resource and the indicated frequency domain resource.

In one embodiment, the number of bits for cancellation indication for a time domain resource and a frequency domain resource for a UL carrier is configured by an RRC parameter together with positionInDCI in CI-ConfigurationPerServingCell. The granularity of each bit for time domain resource indication in the UL CI is configured by an RRC parameter. To determine the number of bits used for indicating a time domain resource, it may be calculated based on the number of symbols in the configured time duration of an RUR after excluding semi-static DL symbols, denoted as $T_{RUR}$, and the granularity of time domain resource indication, e.g.

$$T_{CI} = \left\lceil \frac{T_{RUR}}{\text{granularity}} \right\rceil.$$

Then each bit of the first $$\left(T_{CI} - T_{RUR} + \left\lfloor \frac{T_{RUR}}{T_{CI}} \right\rfloor \cdot T_{CI}\right)$$

bits indicates $$\left\lfloor \frac{T_{RUR}}{T_{CI}} \right\rfloor$$

symbols, and each bits of the last $$\left(T_{RUR} - \left\lfloor \frac{T_{RUR}}{T_{CI}} \right\rfloor \cdot T_{CI}\right)$$

bits indicates $$\left\lceil \frac{T_{RUR}}{T_{CI}} \right\rceil$$

symbols. The rest of the bits may be used for indicating a frequency domain resource, and the number of bits used for indicating the frequency domain resource is integer multiple times of the number used for indicating the time domain resource, e.g., $$F_{CI} = \left\lfloor \frac{\text{total number of bits} - T_{CI}}{T_{CI}} \right\rfloor \cdot T_{CI}.$$

For each bit in $$T_{CI}, \left\lfloor \frac{\text{total number of bits} - T_{CI}}{T_{CI}} \right\rfloor$$

bits is used to indicate the preempted resource corresponding to the indicated time domain resource. The indication of a frequency domain resource may be done in the same way as the above methods, by replacing the $F_{CI}$ by $$F'_{CI} = \left\lfloor \frac{\text{total number of bits} - T_{CI}}{T_{CI}} \right\rfloor.$$

In an embodiment, the number of bits for cancellation indication for a time domain resource and a frequency domain resource for a UL carrier is configured by an RRC parameter in CI-ConfigurationPerServingCell. In one alternative, the same number of bits is applied to all carriers. The granularity of each bit for time domain indication in the UL CI is configured by an RRC parameter and a reference SCS. The configured time duration of an RUR for each carrier is the same. For example, if the time duration is configured as a number of symbols based on a reference SCS, then the configured time duration of an RUR for each carrier is determined based on scaling the number of symbols in the reference SCS by $$\frac{SCS \text{ of the carrier}}{\text{reference } SCS}.$$

For determination of the granularity of time domain indication, the same number of symbols may be used for each carrier with a different SCS. Alternatively, the number of symbols may be scaled by the ratio of the SCS of the carrier and a reference SCS. The number of bits used for time domain resource allocation, granularity, and number of bits for frequency resource indication for each carrier may be determined the same way as in above methods. The number of PRBs of reference frequency resource for each carrier may be configured explicitly by RRC parameters.

Handling UCI on Pre-Empted PUSCH

For the case where a PUSCH is overlapping with a PUCCH, and the PUSCH is preempted by a UL CI, the following method is proposed. To avoid unnecessary dropping of the PUCCH, a timeline condition is defined for the UE to determine whether to drop the PUCCH or transmit the PUCCH. In an embodiment, the Rel-15 timeline requirement defined in TS 38.213 V15.7.0 (available at https://portal.3gpp.org/desktopmodules/Specifications/SpecificationDetails.aspx?specificationId=3215 and hereby incorporated in its entirety by reference) for UCI multiplexing is used as a baseline to achieve the purpose without increasing the complexity of eMBB UE, such as the following.

If a UE would transmit multiple overlapping PUCCHs in a slot or overlapping PUCCH(s) and PUSCH(s) in a slot, the UE is configured to multiplex different UCI types in one PUCCH (when applicable, as described in Subclauses 9.2.5.1 and 9.2.5.2 in TS 38.214 V15.7.0), and at least one of the multiple overlapping PUCCHs or PUSCHs is in response to a DCI format detection by the UE, the UE multiplexes all corresponding UCI types if the following conditions are met.

The PUSCHs satisfying the following conditions are considered. The first symbol $S_0$ of the earliest PUCCH or PUSCH, among a group overlapping PUCCHs and PUSCHs in the slot, satisfies the following timeline conditions. If there is a PDCCH carrying a UL CI with indicated resource overlapping with the PUSCHs in the overlapping group of PUCCHs and PUSCHs, it is determined if $S_0$ is before a symbol with a cyclic prefix (CP) starting after $T_{proc,2}^{mux}$ after a last symbol of the PDCCH carrying the UL CI. $T_{proc,2}^{mux}$ is given by a maximum of $\{T_{proc,2}^{mux,1}, \ldots, T_{proc,2}^{mux,i}, \ldots\}$ where for the i-th PUSCH which is in the group of overlapping PUCCHs and PUSCHs, $T_{proc,2}^{mux,i}=\max((N_2+d_{2,1}+1)\cdot(2048+144)\cdot\kappa\cdot2^{-\mu}\cdot T_C, d_{2,2})$, $d_{2,1}=0$ and $d_{2,2}$ are selected for the i-th PUSCH following [6, TS 38.214], $N_2$ is selected based on the UE PUSCH processing capability 2 and SCS configuration $\mu$, where $\mu$ corresponds to the smallest SCS configuration among the SCS configurations used for the PDCCH carrying UL CI, PDCCH scheduling the i-th PUSCH, the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If $S_0$ is before a symbol with the CP starting after $T_{proc,2}^{mux}$ after a last symbol of the PDCCH carrying a UL CI, all PUSCHs in the overlapping group of PUSCHs and PUCCHs are considered for multiplexing. However, if $S_0$ is not before a symbol with the CP starting after $T_{proc,2}^{mux}$ after a last symbol of the PDCCH carrying a UL CI, PUSCHs overlapping with the indicated resource by a UL CI are not considered for multiplexing. If there is no PDCCH carrying a UL CI with indicated resource overlapping with the PUSCHs in the overlapping group of PUCCHs and PUSCHs, all PUSCHs in the overlapping group of PUSCHs and PUCCHs are considered for multiplexing.

If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions.

$S_0$ is not before a symbol with the CP starting after $T_{proc,1}^{mux}$ after a last symbol of any corresponding PDSCH, $T_{proc,1}^{mux}$ is given by a maximum of $\{T_{proc,1}^{mux,1}, \ldots, T_{proc,1}^{mux,i}, \ldots\}$ where for the i-th PDSCH with corresponding HARQ-ACK transmission on a PUCCH which is in the group of overlapping PUCCHs and PUSCHs, $T_{proc,1}^{mux,i}=((N_1+d_{1,1}+1)\cdot(2048+144)\cdot\kappa\cdot2^{-\mu}\cdot T_C$, $d_{1,1}$ is selected for the i-th PDSCH following [6, TS 38.214], $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

$S_0$ is not before a symbol with the CP starting after $T_{proc,release}^{mux}$ after a last symbol of any corresponding SPS PDSCH release. $T_{proc,release}^{mux}$ given by a maximum of $\{T_{proc,release}^{mux,1}, \ldots, T_{proc,release}^{mux,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{mux,i}=(N+1)\cdot(2048+144)\cdot\kappa\cdot2^{-\mu}\cdot T_C$, N is described in Subclause 10.2 of TS 38.213 V15.7.0 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

If there is no aperiodic channel state information (CSI) report multiplexed in a PUSCH in the group of overlapping PUCCHs and PUSCHs, $S_0$ is not before a symbol with the CP starting after $T_{proc,2}^{mux}$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot.

If there is at least one PUSCH in the group of overlapping PUCCHs and PUSCHs, $T_{proc,2}^{mux}$ is given by a maximum of $\{T_{proc,2}^{mux,1}, \ldots, T_{proc,2}^{mux,i}, \ldots\}$ where for the i-th PUSCH which is in the group of overlapping PUCCHs and PUSCHs, $T_{proc,2}^{mux,i}=\max((N_2+d_{2,1}+1)\cdot(2048+144)\cdot\kappa\cdot2^{-\mu}\cdot T_C, d_{2,2})$, $d_{2,1}$ and $d_{2,2}$ are selected for the i-th PUSCH following [6, TS 38.214], $N_2$ is selected based on the UE PUSCH processing capability of the i-th PUSCH and the SCS configuration $\mu$, where $\mu$ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If there is no PUSCH in the group of overlapping PUCCHs and PUSCHs, $T_{proc,2}^{mux}$ is given by a maximum of $\{T_{proc,2}^{mux,1}, \ldots, T_{proc,2}^{mux,i}, \ldots\}$ where for the i-th PDSCH with corresponding HARQ-ACK transmission on a PUCCH which is in the group of overlapping PUCCHs, $T_{proc,2}^{mux,i}=(N_2+1)\cdot(2048+144)\cdot\kappa\cdot 2^{-\mu}\cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. μ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

If there is an aperiodic CSI report multiplexed in a PUSCH in the group of overlapping PUCCHs and PUSCHs, $S_0$ is not before a symbol with CP starting after $T_{proc,CSI}^{mux}=\max((Z+d)\cdot(2048+144)\cdot\kappa\cdot 2^{-\mu}\cdot T_C, d_{2,2})$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot, where μ corresponds to the smallest SCS configuration among the SCS configuration of the PDCCHs, the smallest SCS configuration for the group of the overlapping PUSCHs, and the smallest SCS configuration of CSI-RS associated with the DCI format scheduling the PUSCH with the multiplexed aperiodic CSI report, and d=2 for μ=0,1, d=3 for μ=2, and d=4 for μ=3. $N_1$, $N_2$, $d_{1,1}$, $d_{2,2}$, $d_{2,2}$, and Z are defined in [6, TS 38.214], and K and $T_C$ are defined in [4, TS 38.211]. Each of the listed clauses are incorporated herein by reference.

It is noted that, based on the above method, in case a PUCCH overlaps with multiple PUSCHs, if the PUSCH on which the PUCCH was going to be multiplexed is cancelled, the PUCCH may be multiplexed on another PUSCH if timeline requirements are satisfied. In one embodiment, in case the start of a PUSCH overlaps with the resource indicated by a UL CI, the UE cancels the whole PUSCH. The gNB may schedule another PUSCH on the resource not indicated by the UL CI in the cancelled PUSCH. UE restarts drx-RetransmissionTimerUL when the UL CI is received.

The description in this disclosure contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

Description on Selected Terms

Timer: A Medium Access Control (MAC) entity can setup one or more timers for individual purposes, for example, triggering some uplink signaling retransmission or limiting some uplink signaling retransmission period. A timer is running once it is started, until it is stopped or until it expires; otherwise it is not running. A timer can be started if it is not running or restarted if it is running. A timer is always started or restarted from its initial value. The initial value can be, but is not limited to be, configured by the gNB via downlink RRC signaling.

BWP: A subset of the total cell bandwidth of a cell is referred to as a Bandwidth Part (BWP) and beamwidth part adaptation is achieved by configuring the UE with BWP(s) and telling the UE which of the configured BWPs is currently the active one. To enable Bandwidth Adaptation (BA) on the primary cell (PCell), the gNB configures the UE with UL and DL BWP(s). To enable BA on secondary cells (SCells) in case of CA, the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. The UE may be configured with a first active uplink BWP by a firstActiveUplinkBWP IE. If the first active uplink BWP is configured for a special cell (SpCell), the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

Rel-15 timeline requirements for UCI multiplexing: If a UE would transmit multiple overlapping PUCCHs in a slot or overlapping PUCCH(s) and PUSCH(s) in a slot and, when applicable, as described in Subclauses 9.2.5.1 and 9.2.5.2 in TS 38.214 V15.7.0, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions.

$S_0$ is not before a symbol with the CP starting after $T_{proc,1}^{mux}$ after a last symbol of any corresponding PDSCH, $T_{proc,1}^{mux}$ is given by a maximum of $\{T_{proc,1}^{mux,1}, \ldots, T_{proc,1}^{mux,i}, \ldots\}$ where for the i-th PDSCH with corresponding HARQ-ACK transmission on a PUCCH which is in the group of overlapping PUCCHs and PUSCHs, $T_{proc,1}^{mux,i}=(N_1+d_{1,1}+1)\cdot(2048+144)\cdot\kappa\cdot 2^{-\mu}\cdot T_C$, $d_{1,1}$ is selected for the i-th PDSCH following [6, TS 38.214], $N_1$ is selected based on the UE PDSCH processing capability of the i-th PDSCH and SCS configuration μ, where μ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

$S_0$ is not before a symbol with the CP starting after $T_{proc,release}^{mux}$ after a last symbol of any corresponding SPS PDSCH release. $T_{proc,release}^{mux}$ given by a maximum of $\{T_{proc,release}^{mux,1}, \ldots, T_{proc,release}^{mux,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{mux,i}=(N+1)\cdot(2048+144)\cdot\kappa\cdot 2^{-\mu}\cdot T_C$, N is described in Subclause 10.2 of TS 38.213 V15.7.0 and is selected based on the UE PDSCH processing capability of the i-th SPS PDSCH release and SCS configuration μ, where μ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

If there is no aperiodic CSI report multiplexed in a PUSCH in the group of overlapping PUCCHs and PUSCHs, $S_0$ is not before a symbol with the CP starting after $T_{proc,2}^{mux}$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot.

If there is at least one PUSCH in the group of overlapping PUCCHs and PUSCHs, $T_{proc,2}^{mux}$ is given by a maximum of $\{T_{proc,2}^{mux,1}, \ldots, T_{proc,2}^{mux,i}, \ldots\}$ where for the i-th PUSCH which is in the group of overlapping PUCCHs and PUSCHs, $T_{proc,2}^{mux,i} = \max((N_2 + d_{2,1} + 1) \cdot (2048 + 144) \cdot \kappa \cdot 2^{-\mu} \cdot T_C, d_{2,2})$, $d_{2,1}$ and $d_{2,2}$ are selected for the i-th PUSCH following [6, TS 38.214], $N_2$ is selected based on the UE PUSCH processing capability of the i-th PUSCH and SCS configuration μ, where μ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If there is no PUSCH in the group of overlapping PUCCHs and PUSCHs, $T_{proc,2}^{mux}$ is given by a maximum of $\{T_{proc,2}^{mux,1}, \ldots, T_{proc,2}^{mux,i}, \ldots\}$ where for the i-th PDSCH with corresponding HARQ-ACK transmission on a PUCCH which is in the group of overlapping PUCCHs, $T_{proc,2}^{mux,i} = (N_2+1) \cdot (2048+144) \cdot \kappa \cdot 2^{-\mu} \cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. μ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

If there is an aperiodic CSI report multiplexed in a PUSCH in the group of overlapping PUCCHs and PUSCHs, $S_0$ is not before a symbol with CP starting after $T_{proc,CSI}^{mux} = \max((Z+d) \cdot (2048+144) \cdot \kappa \cdot 2^{-\mu} \cdot T_C, d_{2,2})$ after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot, where μ corresponds to the smallest SCS configuration among the SCS configurations of the PDCCHs, the smallest SCS configuration for the group of the overlapping PUSCHs, and the smallest SCS configuration of CSI-RS associated with the DCI format scheduling the PUSCH with the multiplexed aperiodic CSI report, and d=2 for μ=0,1, d=3 for μ=2, and d=4 for μ=3. $N_1$, $N_2$, $d_{1,1}$, $d_{2,1}$, $d_{2,2}$, and Z are defined in [6, TS 38.214], and K and $T_C$ are defined in [4, TS 38.211].

$T_{proc,2}$: $T_{proc,2} = \max((N_2+d_{2,1})(2048+144) \cdot \kappa 2^{-\mu} \cdot T_C, d_{2,2})$. $N_2$ is based on μ of Table 6.4-1 and Table 6.4-2 of TS 38.214 for UE processing capability 1 and 2, respectively, where μ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and p UL corresponds to the subcarrier spacing of the uplink channel with which the PUSCH is to be transmitted, and x is defined in subclause 4.1 of [4, TS 38.211]. If the first symbol of the PUSCH allocation includes DM-RS only, then $d_{2,1}=0$, otherwise $d_{2,1}=1$. If the UE is configured with multiple active component carriers, the first uplink symbol in the PUSCH allocation further includes the effect of timing differences between component carriers as given in [11, TS 38.133]. If the scheduling DCI triggered a switch of BWP, $d_{2,2}$ equals the switching time as defined in [11, TS 38.133], otherwise $d_{2,2}=0$.

Handling overbooking of non-overlapping Control Channel Element (CCE) and PDCCH candidates: For all search space sets within a slot n, denote by $S_{CSS}$ a set of CSS sets with cardinality of $I_{CSS}$ and by $S_{USS}$ a set of UE-specific SS (USS) sets with cardinality of $J_{USS}$. The location of USS sets $S_j$, $0 \leq j \leq J_{USS}$, in $S_{USS}$ is according to an ascending order of the search space set index.

Denote by $M_{S_{CSS}(i)}^{(L)}$, $0 \leq i \leq I_{CSS}$, the number of counted PDCCH candidates for monitoring for CSS set $S_{CSS}(i)$ and by $M_{S_{USS}(j)}^{(L)}$, $0 \leq j \leq J_{USS}$, the number of counted PDCCH candidates for monitoring for USS set $S_{USS}(j)$. For the CSS sets, a UE monitors $$M_{PDCCH}^{CSS} = \sum_{i=0}^{I_{CSS}-1} \sum_{L} M_{S_{CSS}(i)}^{(L)}$$

PDCCH candidates requiring a total of $C_{PDCCH}^{CSS}$ non-overlapping CCEs in a slot.

The UE allocates PDCCH candidates for monitoring to USS sets for the primary cell having an active DL BWP with SCS configuration μ in slot n according to the following pseudocode. A UE does not expect to monitor PDCCH in a USS set without allocated PDCCH candidates for monitoring. Denote by $V_{CCE}(S_{USS}(j))$ the set of non-overlapping CCEs for search space set $S_{USS}(j)$ and by $\ell(V_{CCE}(S_{USS}(j)))$ the cardinality of $V_{CCE}(S_{USS}(j))$ where the non-overlapping CCEs for search space set $S_{USS}(j)$ are determined considering the allocated PDCCH candidates for monitoring for the CSS sets and the allocated PDCCH candidates for monitoring for all search space sets $S_{USS}(k)$, $0 \leq k \leq j$.

Set $M_{PDCCH}^{USS} = \min(M_{PDCCH}^{max,slot,\mu}, M_{PDCCH}^{total,slot,\mu}) - M_{PDCCH}^{CSS}$ Set $C_{PDCCH}^{USS} = \min(C_{PDCCH}^{max,slot,\mu}, C_{PDCCH}^{total,slot,\mu}) - C_{PDCCH}^{CSS}$ Set $j=0$ while $\Sigma_L M_{S_{USS}(j)}^{(L)}$ AND $\ell(V_{CCE}(S_{USS}(j))) \leq C_{PDCCH}^{USS}$ allocate $\Sigma_L M_{S_{USS}(j)}^{(L)}$ PDCCH candidates for monitoring to USS set $S_{USS}(j)$ $M_{PDCCH}^{USS} = M_{PDCCH}^{USS} - \Sigma_L M_{S_{USS}(j)}^{(L)}$;

$C_{PDCCH}^{USS} = C_{PDCCH}^{USS} - \ell(V_{CCE}(S_{USS}(j)))$;

$j=j+1$;

end while

For consistency and ease of understanding, like features are identified (although, in some examples, not shown) by numerals in the example figures. However, the features in different implementations may be different in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may comprise computer-executable instructions stored on a computer-readable medium, such as memory or other type of storage devices. For example, one or more microprocessors or general-purpose computers with communication processing capability may be programmed with corresponding executable instructions and carry out the described network function(s) or algorithm(s). The microprocessors or general purpose computers may be formed of Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read Only Memory (CD ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) typically includes at least one base station, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an internet) through a Radio Access Network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A base station may include, but is not limited to, a Node B (NB) as in the UMTS, an evolved Node B (eNB) as in the LTE-A, a Radio Network Controller (RNC) as in the UMTS, a Base Station Controller (BSC) as in the GSM/GERAN, an NG-eNB as in an E-UTRA base station in connection with the 5GC, a next generation Node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible configurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate, and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least downlink (DL) transmission data, a guard period, and uplink (UL) transmission data should be included. Additionally, the respective portions of the DL transmission data, the guard period, and the UL transmission data should also be configurable, for example, based on the network dynamics of NR. In addition, an SL resource may also be provided in an NR frame to support ProSe services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, and B exists alone. In addition, the character "/" herein generally represents that the former and latter associated objects are in an "or" relationship.

Hardware Example Applicable in this Disclosure

Figure 5A:
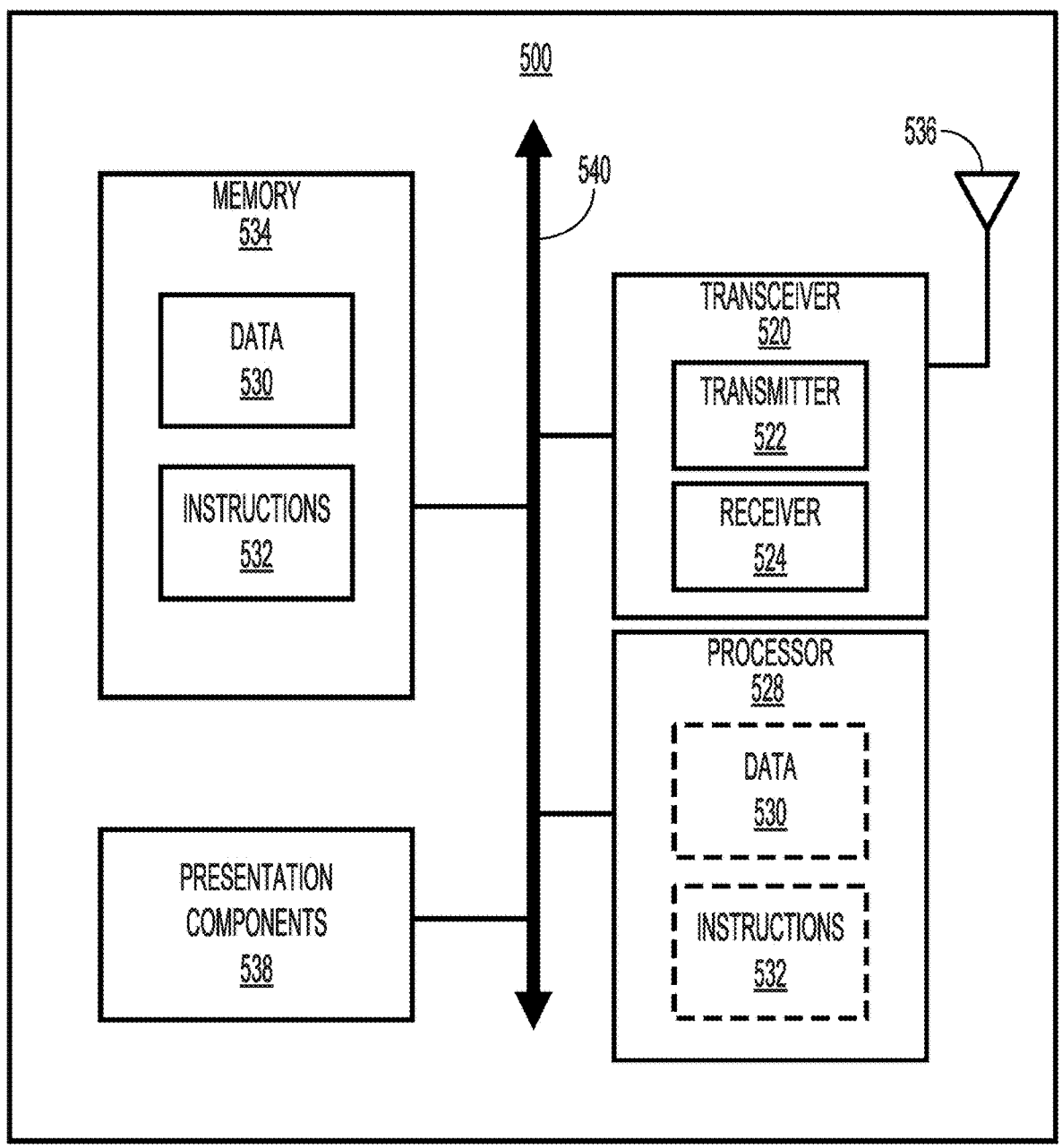
FIG. 5A illustrates a block diagram of a node for wireless communication, in accordance with various aspects of the present application.

FIG. 5 illustrates a block diagram of a node for wireless communication, in accordance with various aspects of the present application. As shown in FIG. 5, a node 500 may include a transceiver 520, a processor 528, a memory 534, one or more presentation components 538, and at least one antenna 536. The node 500 may also include a radio frequency (RF) spectrum band module, a base station communications module, a network communications module, and a system communications management module, Input/Output (I/O) ports, I/O components, and power supply (not explicitly shown in FIG. 5). Each of these components may be in communication with each other, directly or indirectly, over one or more buses 540. In one implementation, the node 500 may be a UE or a base station that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable, and flexibly usable subframes and slot formats. The transceiver 520 may be configured to receive data and control channels.

The node 500 may include a variety of computer-readable media. Computer-readable media can be any available media that can be accessed by the node 500 and include both volatile and non-volatile media, removable and non-removable media. By way of example, and not limitation, computer-readable media may include computer storage media and communication media. Computer storage media includes both volatile and non-volatile, removable and non-removable media implemented in any method or technology for storage of information such as computer-readable technology.

Computer storage media includes RAM, ROM, EEPROM, flash memory, or other memory technology, CD-ROM, Digital Versatile Disks (DVD), or other optical disk storage, magnetic cassettes, magnetic tape, magnetic disk storage, or other magnetic storage devices. Computer storage media does not include a propagated data signal. Communication media typically embodies computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

The memory 534 may include computer-storage media in the form of volatile and/or non volatile memory. The memory 534 may be removable, non-removable, or a combination thereof. Exemplary memory includes solid-state memory, hard drives, optical-disc drives, etc. As illustrated in FIG. 5, The memory 534 may store computer-readable, computer-executable instructions 532 (e.g., software codes) that are configured to, when executed, cause the processor 528 to perform various functions described herein, for example, with reference to FIGS. 1 through 4. Alternatively, the instructions 532 may not be directly executable by the processor 528 but be configured to cause the node 500 (e.g., when compiled and executed) to perform various functions described herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the instructions 532 received from the memory 534, and information through the transceiver 520, the baseband communications module, and/or the network communications module. The processor 528 may also process information to be sent to the transceiver 520 for transmission through the antenna 536, to the network communications module for transmission to a core network.

One or more presentation components 538 presents data indications to a person or other device. Exemplary presentation components 538 include a display device, speaker, printing component, vibrating component, etc.

Figure 5B:
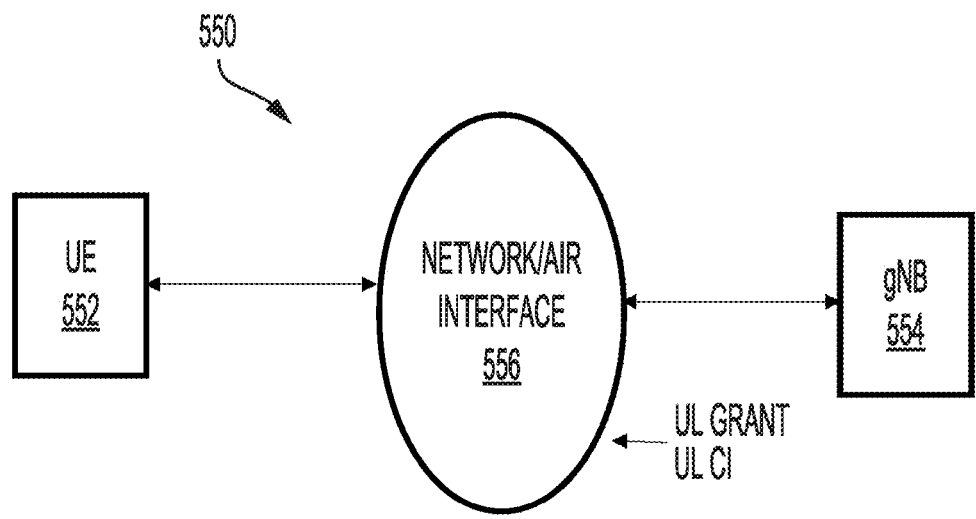
FIG. 5B illustrates a block diagram of a basic network including a UE and a gNB.

FIG. 5B illustrates a network 550 including a device such as a UE 552 that communicates through a network or an air interface 556 with a cellular node such as a gNB 554. FIG. 5B shows the UE 552 receiving the UL grant and the UL CI transmitted from the gNB 554. In one aspect, the steps of determining whether the UL resource overlaps with the PUSCH to yield a determination and, when the determination indicates that the UL resource overlaps with the PUSCH, cancelling the PUSCH, can be practiced on the UE 552. In another aspect, any one or more steps disclosed herein can be performed by one or more of the UE 552 and/or the gNB or cellular node 554.

Figure 6:
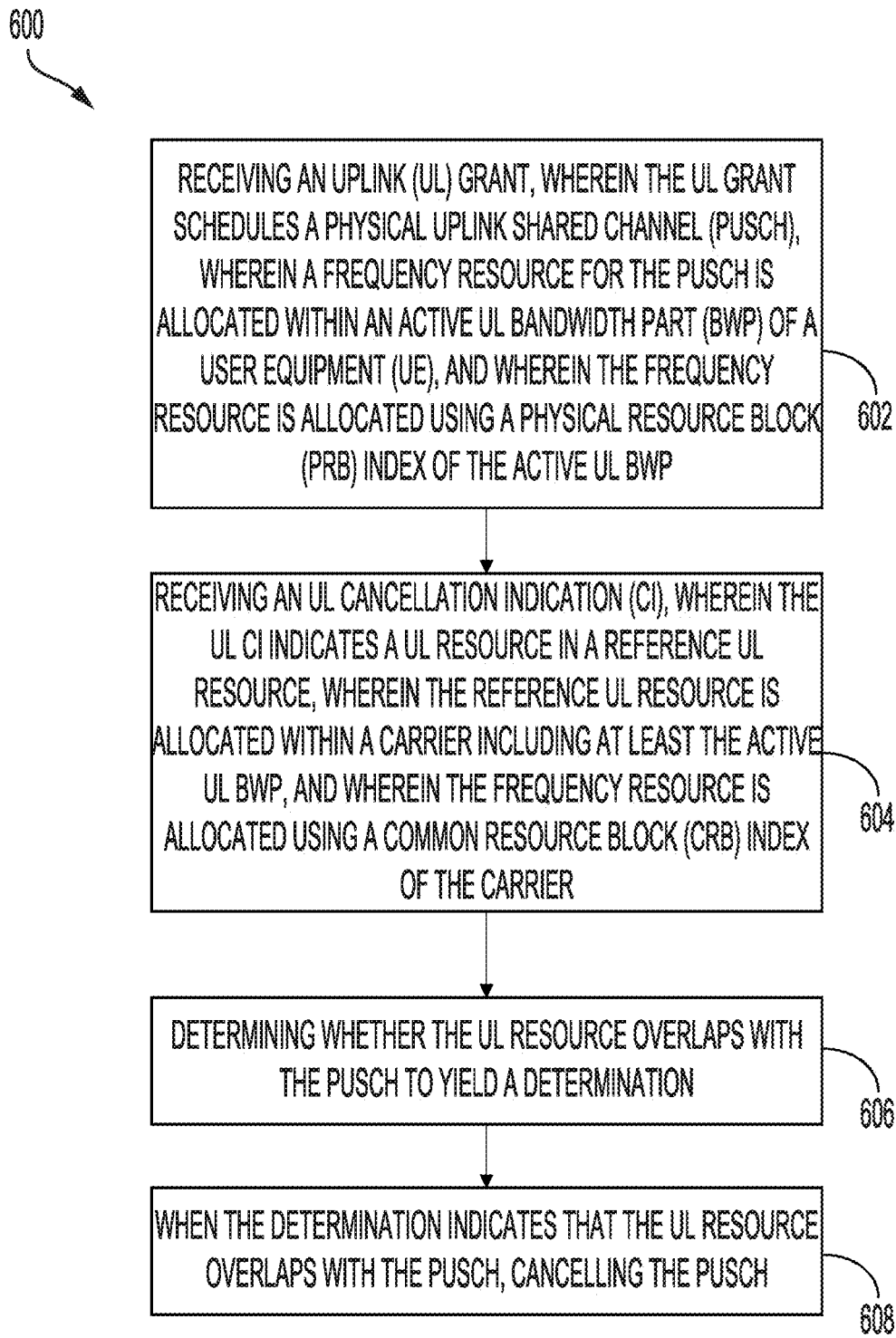
FIG. 6 illustrates an example method according to an aspect of this disclosure.

FIG. 6 illustrates a method embodiment 600 of this disclosure. The method includes one or more of steps including receiving an uplink (UL) grant, wherein the UL grant schedules a Physical Uplink Shared Channel (PUSCH), wherein a frequency resource for the PUSCH is allocated within an active UL Bandwidth Part (BWP) of a user equipment (UE), and wherein the frequency resource is allocated using a physical resource block (PRB) index of the active UL BWP (602). The method further includes receiving a UL cancellation indication (CI), wherein the UL CI indicates a UL resource in a reference UL resource, wherein the reference UL resource is allocated within a carrier including at least the active UL BWP, and wherein the frequency resource is allocated using a common resource block (CRB) index of the carrier (604), determining whether the UL resource overlaps with the PUSCH to yield a determination (606) and, when the determination indicates that the UL resource overlaps with the PUSCH, cancelling the PUSCH (608).

The method can further include defining a starting symbol of the reference UL resource. The starting symbol can be defined as a first symbol after a time duration from an end of the UL CI and the time duration can be defined based on a first time duration of minimum processing for decoding the UL grant and preparing the PUSCH and a second time duration configured by gNB. The first time duration can be determined based on a smallest subcarrier spacing (SCS) of an SCS of a downlink with which a Physical Downlink Control Channel (PDCCH) carrying the UL CI was received and a smallest SCS of configured UL BWPs of the carrier. The method can further include determining symbol durations of one or more symbols of the UL resource, wherein the symbol durations are based on a subcarrier spacing (SCS) of a downlink (DL) BWP in which the UL CI was received.

A method, system, or computer-readable storage medium or device can cover any device or component described herein and the steps or operations performed by the device. For example, embodiments can be claimed from the standpoint of the user equipment (UE) described herein, which can receive signals (UL Grant/UL CI) and perform certain steps. In another aspect, operations can be claimed from the standpoint of a cellular node such as a gNB or other cellular (or other network protocol) wireless component that communicates with UEs. In such an example, the steps can include features performed by the gNB such as transmitting a UL Grant signal and transmitting a UL CI signal for use by the UE in determining whether to cancel the PUSCH or to perform some other action.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE) for handling an uplink (UL) cancellation indication (CI), the method comprising:
   receiving a UL grant scheduling a Physical Uplink Shared Channel (PUSCH), a frequency resource for the PUSCH being allocated within an active UL Bandwidth Part (BWP) of the UE;
   receiving the UL CI, the UL CI indicating a UL resource in a reference UL resource, the reference UL resource being allocated within a carrier including at least the active UL BWP;
   defining a starting symbol of the reference UL resource; and
   in a case that the UL CI is received after the UL grant, determining whether the UL resource overlaps the PUSCH, and
   in a case that the UL resource overlaps the PUSCH, cancelling the PUSCH,
   wherein:
   the starting symbol is defined as a first symbol after a time duration from an end of the UL CI,
   the time duration is defined based on a first time duration of minimum processing for decoding the UL grant and preparing the PUSCH and a second time duration configured by a Next-Generation Node B (gNB), and
   the first time duration is determined based on a smallest subcarrier spacing (SCS) of a downlink (DL) in which a Physical Downlink Control Channel (PDCCH) carrying the UL CI was received and a smallest SCS of configured UL BWPs of the carrier.

2. The method of claim 1, further comprising determining symbol durations of one or more symbols of the UL resource, wherein the symbol durations are based on the SCS of the DL BWP in which the UL CI was received.

3. The method of claim 1, wherein the frequency resource is allocated using a physical resource block (PRB) index of the active UL BWP.

4. The method of claim 1, wherein the reference UL resource is allocated using a common resource block (CRB) index of the carrier.

5. A non-transitory, computer-readable storage medium storing computer-executable instructions that, when executed by one or more processors of a user equipment (UE), cause the UE to:
   receive an uplink (UL) grant scheduling a Physical Uplink Shared Channel (PUSCH), a frequency resource for the PUSCH being allocated within an active UL Bandwidth Part (BWP) of the UE;
   receive a UL cancellation indication (CI) indicating a UL resource in a reference UL resource, the reference UL resource being allocated within a carrier including at least the active UL BWP;
   define a starting symbol of the reference UL resource; and
   in a case that the UL CI is received after the UL grant, determine whether the UL resource overlaps the PUSCH, and
   in a case that the UL resource overlaps the PUSCH, cancel the PUSCH,
   wherein:
   the starting symbol is defined as a first symbol after a time duration from an end of the UL CI,
   the time duration is defined based on a first time duration of minimum processing for decoding the UL grant and preparing the PUSCH and a second time duration configured by a Next-Generation Node B (gNB), and
   the first time duration is determined based on a smallest subcarrier spacing (SCS) of a downlink (DL) in which a Physical Downlink Control Channel (PDCCH) carrying the UL CI was received and a smallest SCS of configured UL BWPs of the carrier.

6. The non-transitory, computer-readable storage medium of claim 5, wherein the computer-executable instructions further cause the UE to determine symbol durations of one or more symbols of the UL resource, wherein the symbol durations are based on the SCS of the DL BWP in which the UL CI was received.

7. The non-transitory, computer-readable storage medium of claim 5, wherein the frequency resource is allocated using a physical resource block (PRB) index of the active UL BWP.

8. The non-transitory, computer-readable storage medium of claim 5, wherein the reference UL resource is allocated using a common resource block (CRB) index of the carrier.

9. A user equipment (UE) for handling an uplink (UL) cancellation indication (CI), the UE comprising:

one or more processors; and at least one memory storing computer-executable instructions that, when executed by the one or more processors, cause the UE to:

receive a UL grant scheduling a Physical Uplink Shared Channel (PUSCH), a frequency resource for the PUSCH being allocated within an active UL Bandwidth Part (BWP) of the UE;

receive the UL CI, the UL CI indicating a UL resource in a reference UL resource, the reference UL resource being allocated within a carrier including at least the active UL BWP;

define a starting symbol of the reference UL resource; and in a case that the UL CI is received after the UL grant, determine whether the UL resource overlaps the PUSCH, and in a case that the UL resource overlaps the PUSCH, cancel the PUSCH, wherein:

the starting symbol is defined as a first symbol after a time duration from an end of the UL CI, the time duration is defined based on a first time duration of minimum processing for decoding the UL grant and preparing the PUSCH and a second time duration configured by a Next-Generation Node B (gNB), and the first time duration is determined based on a smallest subcarrier spacing (SCS) of a downlink (DL) in which a Physical Downlink Control Channel (PDCCH) carrying the UL CI was received and a smallest SCS of configured UL BWPs of the carrier.

10. The UE of claim 9, wherein the computer-executable instructions further cause the UE to determine symbol durations of one or more symbols of the UL resource, wherein the symbol durations are based on the SCS of the DL BWP in which the UL CI was received.

11. The UE of claim 9, wherein the frequency resource is allocated using a physical resource block (PRB) index of the active UL BWP.

12. The UE of claim 9, wherein the reference UL resource is allocated using a common resource block (CRB) index of the carrier.

* * * * *